US007079046B2

(12) United States Patent
Tanaka

(10) Patent No.: US 7,079,046 B2
(45) Date of Patent: Jul. 18, 2006

(54) MULTI-POINT DATA ACQUISITION APPARATUS

(75) Inventor: Takehisa Tanaka, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 486 days.

(21) Appl. No.: 10/686,728

(22) Filed: Oct. 17, 2003

(65) Prior Publication Data

US 2004/0207540 A1 Oct. 21, 2004

(30) Foreign Application Priority Data

Mar. 28, 2003 (JP) ............................ 2003-089926
Mar. 28, 2003 (JP) ............................ 2003-089927
Mar. 28, 2003 (JP) ............................ 2003-089928
Mar. 28, 2003 (JP) ............................ 2003-089929

(51) Int. Cl.
*G08C 19/22* (2006.01)
*H04Q 9/00* (2006.01)
*G05B 19/02* (2006.01)
*G05B 23/023* (2006.01)
*G06F 15/00* (2006.01)

(52) U.S. Cl. .................. 340/870.07; 340/3.1; 340/3.3; 340/3.31; 340/825.22; 340/825.37; 702/178; 702/189; 710/1

(58) Field of Classification Search ........... 340/870.07, 340/3.1, 3.3, 3.31, 825.22, 825.37; 702/178, 702/189; 710/1
See application file for complete search history.

(56) References Cited

U.S. PATENT DOCUMENTS 4,135,181 A * 1/1979 Bogacki et al. ........ 340/870.03
5,579,513 A * 11/1996 Strohmer .................... 713/600
6,199,169 B1 * 3/2001 Voth ........................... 713/400

OTHER PUBLICATIONS

Yukinori Kasajima et al.; DR230/240 Hybrid Recorders in the Darwin Series; Yokogawa Technical Report English Edition No. 25, pp. 5-8.
Tetsuya Sato et al.; Data Acquisition Unit Darwin Series, vol. 40, No. 3, pp. 15-18, (1996). Partial English translation.
Hiroyuki Kuribayashi et al.; Darwin Data Collector DC100, vol. 42, No. 3, pp. 33-36, (1998). Partial English translation.

* cited by examiner

*Primary Examiner*—Jeffery Hofsass
*Assistant Examiner*—Sisay Yacob
(74) *Attorney, Agent, or Firm*—Westerman, Hattori, Daniels & Adrian, LLP.

(57) ABSTRACT

An object of the present invention is to realize a multi-point data acquisition apparatus which enables communication with multiple measurement modules at high speed. The present invention improves upon a multi-point data acquisition apparatus comprising a main module which performs serial communication through a serial bus to multiple measurement modules connected to a single-system serial bus. The main module of the present invention is characterized in that it comprises the following: a timing generating unit which outputs a first timing signal and second timing signal; a setting unit which sets multiple transmission destinations which are measurement modules to be engaged in serial communication, and multiple transmission contents, based on the first timing signal; and a communication processing unit which holds the multiple transmission destinations and multiple transmission contents set by the setting unit, and, based on the second timing signal, sequentially sends transmission contents through the serial bus to the multiple measurement modules set as transmission destinations, performing serial communication.

25 Claims, 19 Drawing Sheets

MULTI-POINT DATA ACQUISITION APPARATUS

BACKGROUND OF THE INVENTION

1. Field of the Invention

The present invention pertains to a multi-point data acquisition apparatus comprising a main module which performs serial communication through a serial bus to multiple measurement modules connected to a single-system serial bus; and pertains in particular to a multi-point data acquisition apparatus capable of communicating with multiple measurement modules at high speed.

2. Description of the Prior Art

When signals of various physical quantities such as voltage, resistance, and temperature are measured, multiple modules which have assigned different function are used to do measurements and collect data. In addition, if there are numerous measurement points, multiple modules with identical functions are used to do measurements and collect data, even in cases where measured signals are same kind of physical quantities. A multi-point data acquisition apparatus is one in which these modules are formed together into a single unit on an internal bus, such as a serial bus (see, for example, the following references).

Reference 1: Sato, Tetsuya and one other. "DARWIN Series Data Acquisition Units." *Yokogawa Technical Report*. Yokogawa Electric Corporation, 1996. Vol. 40, No. 3, pp. 95–98.

Reference 2: Kasajima and three others. "DR230/240 DARWIN Series Hybrid Recorders." *Yokogawa Technical Report*. Yokogawa Electric Corporation, 1997. Vol. 41, No. 3, pp. 73–76.

Reference 3: Kuribayashi and two others. "DC100 DARWIN Series Data Recorder." *Yokogawa Technical Report*. Yokogawa Electric Corporation, 1998. Vol. 43, No. 3, pp. 119–122.

FIG. 1 is a block diagram illustrating a prior art example of such a multi-point data acquisition apparatus.

In FIG. 1, the internal serial bus SB is a single-system serial bus, and is a signal line on which serial data are transmitted. Serial data are transmitted on the serial bus SB according to, for example, the RS485 interface standard.

Measurement modules M1–M3 are modules which perform measurements. They comprise a measurement module communication processing unit 11 and measurement unit 12, and are connected to the internal serial bus SB. The communication processing unit 11 is connected to the serial bus SB and sends and receives serial data. The measurement unit 12 performs measurement with a connected sensor (not shown), such as a probe for voltage measurement, or a thermocouple or resistance temperature detector for temperature measurement. In addition, the measurement unit 12 which is connected with the communication processing unit 11 does measurements, set measurement conditions, and the like in accordance with the content of the serial data received by the communication processing unit 11, and it also output to the communication processing unit 11 the measured data, measurement-end signals, measurement condition setting-end signals, and the like.

A main module 20 comprises a CPU (Central Processing Unit) 21 and a communication processing unit 22 for the main module, and is connected to the internal serial bus SB. In addition, the main module 20 sends, to the measurement modules M1–M3 through the serial bus SB, commands for specifying measurement conditions, measurement-start, measurement-stop, and the like; collects (receives) measurement data from the measurement modules M1–M3; and the like, controlling the entire multi-point data acquisition apparatus. Furthermore, the main module 20 exchanges data with a PC (not shown) which is disposed externally. The communication processing unit 22 is connected to the CPU 21 and internal serial bus SB, and exchanges serial data to communicate through the internal serial bus SB with the prescribed measurement modules M1–M3.

With such an apparatus, the main module 20 communicates with the measurement modules M1–M3 through the internal serial bus SB, sending commands to the measurement modules M1–M3 and collecting measurement data and the like from the measurement modules M1–M3.

It should be noted that the internal serial bus SB is a single-system serial bus. The measurement modules M1–M3 and the main module 20 share a single serial bus SB. More specifically, the individual measurement modules M1–M3 and main module 20 are not connected through individual, independent serial buses. Thus, communication in both directions at the same time is not possible, so, for example, when serial data are being transmitted from the main module 20 to the measurement module M1, it is not possible to transmit serial data from the measurement module M1 to the main module 20 at the same time. In addition, the main module 20 cannot communicate with multiple measurement modules M1–M3 simultaneously, so, for example, when the main module 20 is communicating with the measurement module M1, it cannot communicate with the measurement module M2 or M3 at the same time.

The multi-point data acquisition apparatus is structured in this manner, because reducing the size is very important as well as saving cost. If multiple serial buses are disposed, it would be necessary to dispose multiple communication processing units 22 in the main module 20 as well, thus increasing the size of not just the main module 20 but the overall apparatus as well, and increasing the number of components, thus increasing the cost. In particular, during high-voltage measurements, it is necessary to provide insulation in order to provide a high withstand voltage between the measurement modules M1–M3 and main module 20. Thus it is necessary to use a single-system serial bus in order to reduce the overall apparatus size and reduce the cost.

Thus, because the serial bus is a single system, it is difficult to engage in high-speed communication with multiple measurement modules, which has been problematic.

The apparatus shown in FIG. 1 will now be described in detail separately for the following: (i) case in which the main module transmits data to the measurement modules M1–M3; (ii) case in which the main module receives data from the measurement modules M1–M3 by polling; (iii) case in which the main module engages in data sending and receiving with measurement modules; (iv) case in which the measurement modules M1–M3 transmit measurement data to the main module.

(i) Case in Which the Main Module Transmits Data to the Measurement Modules M1–M3

FIG. 2 is a diagram which provides a detailed illustration of the structure of the apparatus shown in FIG. 1. Herein, items which are the same as in FIG. 1 are denoted by the same symbols and not described. In addition, the structure pertaining to the explanation is illustrated and will be described. In FIG. 2, the main module 20 comprises a CPU 21, a main module communication processing unit 22, and a real-time clock 23, and is connected to the internal serial bus SB.

In addition, the main module 20 sends, to the measurement modules M1–M3 through the serial bus SB, commands for specifying measurement conditions, measurement-start, measurement-stop, and the like; collects (receives) measurement data from the measurement modules M1–M3; and the like, controlling the entire multi-point data acquisition apparatus.

The CPU 21 is a setting unit which takes interrupt signals from the real-time clock 23. The CPU 21 outputs, to the communication processing unit 22, signals which starts serial communication with the measurement modules M1–M3, and it also sets and erases transmission destinations and transmission content for the measurement modules M1–M3 engaging in serial communication.

The communication processing unit 22 comprises a transmission destination register 22*a*, transmission content buffer 22*b*, and sending/receiving means 22*c*. The communication processing unit 22 receives signals which set and erase settings and signals which start transmission from the CPU 21. In addition, the communication processing unit 22 is connected to the internal serial bus SB, and exchanges serial data with the prescribed measurement modules M1–M3 through the internal serial bus SB. When communication with the measurement modules M1–M3 ends, it notifies the CPU 21 of the end of communication. Herein, the transmission destination register 22*a* and transmission content buffer 22*b* are storage means.

The transmission destination register 22*a* holds the transmission destinations set by the CPU 21. The transmission content buffer 22*b* holds the transmission content set by the CPU 21. The sending/receiving means 22*c*, in accordance with the start signal from the CPU 21, reads the transmission destination and transmission content from the transmission destination register 22*a* and transmission content buffer 22*b*, respectively; sends transmission content through the internal serial bus SB to the measurement module M1–M3 which is set as the transmission destination; and receives serial data from the measurement modules M1–M3.

The real-time clock 23 is a timing generating means comprising an internal power supply (not shown). Even if the supply of power from the external power supply is terminated, it operates on power supplied from the internal power supply. It keeps track of the date and time, and outputs interrupt signals, which are timing signals, at prescribed time intervals, such as every 500 ms or every 1 second.

The operations of such an apparatus will now be described.

As an example, operations will be described for a case in which the transmission content of the transmission content buffer 22*b* is sent from the main module 20 to the measurement module M1. The CPU 21 sets the measurement module M1 as the transmission destination in the transmission destination register 22*a* of the communication processing unit 22, and sets the transmission content (e.g., commands such as measurement conditions, measurement-start, and measurement-stop) in the transmission content buffer 22*b*.

Furthermore, if transmission timing or transmission time interval is important to the command, as in the case of a measurement-start instruction, then CPU 21 sets a start signal providing a transmission-start instruction to the sending/receiving means 22*c* of the communication processing unit 22, using the interrupt signal from the clock 23 as a reference.

Based on this start signal, the sending/receiving means 22*c* reads the transmission destination and transmission content from the transmission destination register 22*a* and transmission content buffer 22*b*, respectively, and transmits serial data through the internal serial bus SB to the measurement module M1 (the transmission destination), performing serial communication. It should be noted that serial communication is not connectionless; serial data to which a CRC (Cyclic Redundancy Check) or checksum has been added are transmitted to confirm whether the transmission content has been properly transmitted to the measurement module M1. If transmission fails, the serial data are resent.

Next, when serial communication with the measurement module M1 ends, the communication processing unit 22 notifies the CPU 21 of the end of communication. In response to this, the CPU 21 erases the transmission destination of the transmission destination register 22*a* and the transmission content of the transmission content buffer 22*b*.

The communication processing unit 11 of the measurement module M1, for its part, extracts the measurement-start command from the received serial data and outputs it to the measurement unit 12. The measurement unit 12 then starts measurement.

The operations for cases of serial communication with the measurement module M2 or M3 will not be described because they are the same, except that the setting sent from the CPU 21 to the transmission destination register 22*a* is changed, and the communication processing unit 22 communicates with the set measurement module M2 or M3.

Thus the CPU 21 sets the transmission destination and transmission content in the transmission destination register 22*a* and transmission content buffer 22*b*, and after setting them, outputs a start signal to the communication processing unit 22 as needed, using the interrupt signal from the clock 23 as a reference. Next, when it receives a notification of the end of communication from the communication processing unit 22, the CPU 21 erases the transmission destination and transmission content from the transmission destination register 22*a* and transmission content buffer 22*b*, and sets the next transmission destination and transmission content. Thus the CPU 21 is an intermediary in the setting of transmissions to the measurement modules M1–M3, communication-end checking, and erasing.

In addition, with this type of apparatus, for the measurements of multiple measurement modules M1–M3, measurements are often started simultaneously and with synchronization established. However, because the serial bus SB is a single system, the CPU 21 must send measurement-start commands in sequence separately to each of the measurement modules M1–M3. It first sends a measurement-start command to the measurement module M1, for example. Next, after the transmission to the measurement module M1 ends, it sends a measurement-start command to the measurement module M2, and after the transmission to the measurement module M2 ends, it sends a measurement-start command to the measurement module M3.

For this reason, there has been a certain, fixed time difference, such as approximately one to several milliseconds, between the individual measurement modules M1–M3 by the time the measurement-start command is sent. In addition, because the CPU 21 is always an intermediary, the time difference between the individual measurement modules M1–M3 increases when the CPU 21 is under a high load, such as in cases where it is communicating with an external PC. Thus when the CPU 21 is under a high load, setting in and erasing from the transmission destination register 22*a* and transmission content buffer 22*b* are delayed, and the output of the start signal to the sending/receiving means 22*c* is delayed even when an interrupt signal from the clock 23 is input. For this reason, the time difference between the measurement modules M1–M3 increases. Thus it has been difficult to engage in high-speed communication with multiple measurement modules, which has been problematic.

However, in past measurements, the measurement interval required by users was long, such as approximately 1 second or 500 ms even in the case of the shortest measurement interval. Thus, for practical purposes, it was possible to establish synchronization and start measurement at nearly the same time, and the time difference between the individual measurement modules M1–M3 could be ignored.

However, in recent years, because more detailed measurements are made, the measurement interval required by users has shortened, making it impossible to ignore the time difference between the individual measurement modules M1–M3. Thus there are many demands to reduce the time difference between the individual measurement modules M1–M3.

Even with a single-system serial bus, it is possible to reduce the time difference between the measurement modules M1–M3, if connectionless serial communication is performed. However, this is not practical because it is not possible to confirm whether the transmission content was transmitted from the main module 20 to the measurement modules M1–M3 and reliability is low.

(ii) Case in Which the Main Module Receives Data from the Measurement Modules M1–M3 by Polling FIG. 3 is a diagram which presents a detailed illustration of the structure of the apparatus shown in FIG. 1. Herein, items which are the same as in FIGS. 1 and 2 are denoted by the same symbols and not described. In addition, the structure pertaining to the explanation is illustrated and will be described. In FIG. 3, the main module 20 comprises a CPU 21, a main module communication processing unit 22, and a memory 24, and is connected to the internal serial bus SB.

In addition, the main module 20 sends, to the measurement modules M1–M3 through the serial bus SB, commands for specifying measurement conditions, measurement-start, measurement-stop, and the like; collects (receives) measurement data from the measurement modules M1–M3; and the like, controlling the entire multi-point data acquisition apparatus.

The CPU 21 is a setting unit, which outputs commands to the prescribed measurement modules M1–M3, and sets polling destinations for causing reception of data corresponding to the output commands.

The communication processing unit 22 comprises a polling destination storage means **22*d* and sending/receiving means 22*c*, and is connected to the internal serial bus SB. In addition, the communication processing unit 22 converts the commands output from the CPU 21 to serial data, engages in serial communication with the prescribed measurement modules M1–M3 through the internal serial bus SB, and when serial communication is completed, provides notification of communication-end to the CPU 21. In addition, it collects data by polling from the polling destination set by the CPU 21, and stores the received data in the memory 24**.

The sending/receiving means **22*c*, following the instructions from the CPU 21, sends commands to the measurement modules M1–M3 through the internal serial bus SB, reads the polling destination from the polling destination storage means 22*d***, and receives serial data by polling.

The polling destination storage means **22*d*, following the instructions from the CPU 21, stores the polling destinations, i.e., the measurement modules M1–M3** from which data are to be collected by polling.

The memory 24 is a received-data storage unit which stores data received from the measurement modules M1–M3 by polling.

The operations of such an apparatus will now be described.

As an example, operations will be described for a case in which the main module 20 causes the measurement modules M1–M3 to perform measurements, and collects measurement data.

The CPU 21 of the main module 20 outputs a measurement-start command to the communication processing unit 22, with the measurement module M1 set as the transmission destination. In response to this, the sending/receiving means **22*c* of the communication processing unit 22 converts the command from the CPU 21 to serial data, and sends the serial data through the internal serial bus SB to the measurement module M1 (the transmission destination), performing serial communication. It should be noted that serial communication is not connectionless; serial data to which a CRC or checksum has been added are transmitted to confirm whether the transmission content has been properly transmitted to the measurement module M1. If transmission fails, the serial data are resent. Next, when serial communication with the measurement module M1 ends, the communication processing unit 22 notifies the CPU 21** of the end of communication.

When command transmission to the measurement module M1 ends, thereafter in the same manner, the CPU 21 instructs the communication processing unit 22 to send a command to the measurement module M2, and the communication processing unit 22 engages in communication with the measurement module M2. Next, when command transmission to the measurement module M2 ends, the CPU 21 instructs the communication processing unit 22 to send a command to the measurement module M3, and the communication processing unit 22 engages in communication with the measurement module M3.

When measurement-start command transmission to the measurement modules M1–M3 ends, the CPU 21 stores the measurement modules M1–M3 as polling destinations in the polling destination storage means **22*d* of the communication processing unit 22, and causes the sending/receiving means 22*c* to start collecting data by polling. In response to this, the sending/receiving means 22*c* reads the polling destinations from the polling destination storage means 22*d*, and collects data sequentially by polling the measurement modules M1–M3**.

The operations of the measurement modules M1–M3 will now be described.

The communication processing unit 11 of the measurement modules M1–M3 extracts the measurement-start command from the received serial data and outputs it to the measurement unit 12.

Next, the measurement unit 12, following the measurement-start command, measures the measurement subject and outputs the measurement data from the measurement to the communication processing unit 11. Next, the communication processing unit 11 of the measurement modules M1–M3 adds the measurement data to the response to data collection by polling PM1–PM3 from the sending/receiving means **22*c*. For example, when the sending/receiving means 22*c* performs data collection by polling the measurement module M2, the measurement module M2 adds measurement data to the response to the polling PM2**.

The operations of the main module 20 will now again are described. FIG. 4 is a diagram illustrating the operations of the CPU 21 and communication processing unit 22 in the main module 20. In FIG. 4, the top row shows the operations of the communication processing unit 22 and the bottom row shows the operations of the CPU 21. The horizontal axis shows the time.

The sending/receiving means 22*c* of the communication processing unit 22 sequentially performs polling PM1, polling PM2, and polling PM3 on the measurement modules M1–M3. Next, when, for example, the sending/receiving means 22*c* receives a response with added measurement data from the measurement module M2 in polling PM2, it stops data collection by the polling PM1–PM3. In addition, the communication processing unit 22 extracts the measurement data from the response received by the sending/receiving means 22*c*, storing the measurement data in the memory 24 and notifying the CPU 21 that measurement data have been received.

In response to this notification, the CPU 21 instructs a signal processing unit (not shown) to perform signal processing on the measurement data. Next, when the signal processing of the signal processing unit ends, the sending/receiving means 22*c* is instructed to resume polling. In response to this, the sending/receiving means 22*c* reads the polling destination from the polling destination storage means 22*d* and resumes polling PM1, polling PM2, and polling PM3, sequentially starting with the measurement module M1. Polling PM1–PM3 is then performed until measurement data are again received from any of the measurement modules M1–M3, or an error occurs in communication with any of the measurement modules M1–M3. It should be noted that "error" refers to cases where communication does not end in the normal procedure for the communication content during data collection by polling PM1–PM3, such as cases where there is no communication response from the measurement modules M1–M3, and cases where the CRC or checksum value added to the communication response is abnormal.

Thus because the serial bus SB is a single system, the sending/receiving means 22*c* of the communication processing unit 22 does not simultaneously collect data by polling the measurement modules M1–M3, which are the polling destinations set by the CPU 21; but rather performs polling PM1–PM3 sequentially to collect data.

However, the sending/receiving means 22*c* reads the polling destination from the polling destination storage means 22*d*, and performs polling PM1–PM3 according to this polling destination. For this reason, even if data are received from the measurement module M2, polling PM2 will be performed on the measurement module M2 in the same manner as prior to data reception. More specifically, polling PM2 is performed even on a measurement module M2 from which data have been received, so it takes time to receive data from all of the measurement modules M1–M3. Thus it has been difficult to engage in high-speed communication with multiple measurement modules, which has been problematic.

It is also possible to adopt a structure wherein, each time the sending/receiving means 22*c* receives data and notifies the CPU 21, the CPU 21 resets the polling destination in the polling destination storage means 22*d*. However, this is not realistic, because if the CPU 21 is under a high load due to exchanging data with a PC (not shown), providing signal processing instructions to a signal processing unit (not shown), and the like, then resetting the polling destination will be very time consuming.

(iii) Case in Which the Main Module Engages in Data Sending and Receiving with Measurement Modules FIG. 5 is a diagram which provides a detailed illustration of the structure of the apparatus shown in FIG. 1. Herein, items which are the same as in FIGS. 1–3 are denoted by the same symbols and not described. In addition, the structure pertaining to the explanation is illustrated and will be described. In FIG. 5, the main module 20 comprises a CPU 21, a main module communication processing unit 22, and a clock 23, and is connected to the internal serial bus SB.

In addition, the main module 20 sends, to the measurement modules M1–M3 through the serial bus SB, commands for specifying measurement conditions, measurement-start, measurement-stop, and the like; collects (receives) measurement data from the measurement modules M1–M3; and the like, controlling the entire multi-point data acquisition apparatus.

The CPU 21 is a setting unit which takes interrupt signals are input from the clock 23. It makes transmission destination and transmission content settings, as well as polling settings and the like, in the communication processing unit 22.

The communication processing unit 22 is connected to the internal serial bus SB, and exchanges real-time data through the internal serial bus SB with the prescribed measurement modules M1–M3, performing serial communication, according to the settings from the CPU 21.

The clock 23 is a timing generating means which outputs interrupt signals, every 500 ms or every 1 second, for example.

The operations of such an apparatus will now be described.

First the operations of the CPU 21 of the main module 20 will be described. The CPU 21 first sets, in the communication processing unit 22, the measurement modules M1–M3 to be polled when, for example, the apparatus is initialized, or after the measurement-start command transmission to the measurement modules M1–M3. Herein, a case will be described in which the polling destination is set during initialization. After initialization ends, the measurement module M1–M3 which is the transmission destination, and the transmission content (e.g., measurement-start command), are set in the communication processing unit 22, using the interrupt signal from the clock 23 as a reference.

Next, the operations of the communication processing unit 22 of the main module 20 will be described. FIG. 6 is a diagram illustrating an example of the operations of the communication processing unit 22. FIG. 7 is a flowchart illustrating the state transitions of the communication processing unit 22. In FIG. 6, the top row shows the operations of the CPU 21 and the bottom row shows the operations of the communication processing unit 22. The horizontal axis shows the time.

The communication processing unit 22 performs polling PM1–PM3 on the individual measurement modules M1–M3 in polling mode. For example, each time polling mode is entered, it performs polling PM1, polling PM2, and polling PM3 in sequence. In addition, during each polling PM1–PM3, it communicates with the individual measurement modules M1–M3 and also functions as a watchdog timer for checking the states of the individual measurement modules M1–M3 (S10).

In polling mode, when the transmission destination and transmission content are set from the CPU 21 (e.g., during polling PM2 in FIG. 6), the communication processing unit 22 transfers to transmission mode after the end of polling mode, then converts the measurement-start command in the transmission content to serial data, and performs serial communication to send it to the measurement module M1–M3 which is the set transmission destination (S11, S12).

When transmission ends, the communication processing unit 22 changes again to polling mode from transmission mode (S12, S10), and repeats polling mode until the transmission destination and transmission content are set again from the CPU 21 (S11, S10).

It should be noted that serial communication is not connectionless; serial data to which a CRC or checksum has been added are transmitted to confirm whether the transmission content has been properly transmitted to the measurement module M1. If transmission fails, the serial data are resent.

The operations of the measurement modules will now be described. The communication processing unit 11 of the measurement modules M1–M3 receives the serial data sent by the main module 20, extracts the measurement-start command from the received serial data, and outputs it to the measurement unit 12. Next, the measurement unit 12 performs measurement, and outputs the measurement data to the communication processing unit 11. Next, the communication processing unit 11 outputs the measurement data to the main module 20 while polling PM1–PM3 from the main module 20 is being performed.

The transmission content set by the CPU 21 includes measurement-start, measurement-stop, measurement unit 12 sequence settings, measurement condition (e.g., measurement range) settings, and the like. Among these, transmission timing is not very important for the measurement unit 12 sequence settings, measurement range settings, and the like. In contrast, transmission timing is important for commands providing measurement-start instructions. More specifically, in cases where the measurement unit 12 is to be caused to start measurement at fixed transmission intervals, such as every one second or every 500 ms, it is extremely important to have the communication processing unit 22 transmit with proper timing.

However, because the serial bus SB is a single system, the communication processing unit 22 transitions between polling mode, in which data are received, and transmission mode, in which data are transmitted, without being able to simultaneously engage in transmission and reception with the measurement modules M1–M3. More specifically, when settings are made from the CPU 21 during polling mode, after polling mode ends, the communication processing unit 22 transits to transmission mode and performs transmission, so time is required between the time at which the setting was made and the time at which transmission actually starts. This results in a time difference error in the transmission interval. Thus it has been difficult to engage in high-speed communication with multiple measurement modules, which has been problematic.

However, in past measurements, the measurement interval required by users was long, such as approximately 1 second or 500 ms even in the case of the shortest measurement interval. Thus, even if there was a time difference error in the transmission interval, it could be ignored for practical purposes without any problems occurring.

However, in recent years, because more detailed measurements are made, the measurement interval required by users has shortened, making it impossible to ignore the time difference error, which has been problematic.

(iv) Case in Which the Measurement Modules M1–M3 Transmit Measurement Data to the Main Module In FIG. 1, the main module 20 comprises a CPU 21 and a main module communication processing unit 22, and is connected to the internal serial bus SB. In addition, the main module 20 outputs, to the measurement modules M1–M3 through the serial bus SB, commands for specifying measurement conditions, measurement-start, measurement-stop, and the like; collects measurement data from the measurement modules M1–M3; and the like, controlling the entire multi-point data acquisition apparatus. Furthermore, the main module 20 exchanges data with a PC (not shown) which is disposed externally.

The CPU 21 is a specifying unit, which outputs, to the communication processing unit 22, commands for the measurement modules M1–M3. The communication processing unit 22 is connected to the internal serial bus SB and receives commands from the CPU 21 as inputs. In addition, the communication processing unit 22 exchanges serial data with the prescribed measurement modules M1–M3 through the internal serial bus SB, and notifies the CPU 21 of the results of serial data transmission/reception and the communication state.

The operations of such an apparatus will now be described.

As an example, operations will be described for a case in which the main module 20 causes the measurement modules M1–M3 to perform measurements at prescribed measurement periods, and collects measurement data.

The CPU 21 of the main module 20 outputs a measurement-start command to the communication processing unit 22, with the measurement module M1, for example, among the measurement modules M1–M3, set as the transmission destination. In the case of a measurement-start command, the transmission timing and transmission time interval, i.e., the measurement periods, are important, so the timing is calculated using the interrupt signal from a clock (not shown) as a reference in outputting the command to the communication processing unit 22.

Next, the communication processing unit 22 converts the command from the CPU 21 to serial data, and sends the serial data through the internal serial bus SB to the measurement module M1 (the transmission destination), performing serial communication. It should be noted that serial communication is not connectionless; serial data to which a CRC or checksum has been added are transmitted to confirm whether the transmission content has been properly transmitted to the measurement module M1. If transmission fails, the serial data are resent.

Next, when serial communication with the measurement module M1 ends, the communication processing unit 22 notifies the CPU 21 of the end of communication. In response to this, the CPU 21 causes the communication processing unit 22 to perform polling for receiving measurement data.

The communication processing unit 11 of the measurement module M1 extracts the measurement-start command from the received serial data and outputs it to the measurement unit 12. In response to this, the measurement unit 12 performs sequence measurement on the measurement subject in accordance with the measurement-start command.

Next, the measurement unit 12 outputs a measurement-end signal to the communication processing unit 11 together with the end of sequence measurement. Herein, the "measurement-end signal" is something which indicates the number of pieces of data in the measurement data from sequence measurement by the measurement unit 12, and indicates that the measurement data are valid.

Next, because of the measurement-end signal from the measurement unit 12, the communication processing unit 11 of the measurement module M1 reads the measurement data from the measurement unit 12, converts the read measurement data to serial data, and sends them to the communication processing unit 22 of the main module 20. In addition, the communication processing unit 22 of the main module extracts the measurement data from the received serial data and stores them in a memory (not shown), and notifies the CPU 21 that measurement data have been received.

This notification causes the CPU 21 to instruct the signal processing unit (not shown) to process the measurement data, and to cause the communication processing unit 22 to continue polling until the measurement period elapses, i.e., until the next measurement-start command is output to the communication processing unit 22. Next, when the time for the next measurement start is reached, the CPU 21 again outputs a measurement-start command to the communication processing unit 22, and performs operations thereafter in the same manner.

The operations of causing the measurement modules M2 and M3 to perform measurements and collecting data are not described because they are the same except for the fact that the CPU 21 of the main module 20 sets the measurement modules M2 and M3 as transmission destinations and the communication processing unit 22 engages in communication with the set measurement modules M2 and M3.

In past measurements, the measurement interval required by users was long, such as approximately 1 second or 500 ms even in the case of the shortest measurement interval. Thus, the timings for transmission from the main module 20 (e.g., of the measurement-start command) and transmission from the measurement modules M1–M3 (e.g., of measurement data) never overlapped.

However, in recent years, because more detailed measurements are made, the measurement interval required by users has shortened but the measurement data length has not changed, thus making it difficult to avoid collisions between the timing at which the communication processing unit 22 of the main module 20 receives measurement data from the measurement modules M1–M3, and the timing at which the next measurement-start command is sent. FIG. 8 will be used to describe the operations. FIG. 8(*a*) illustrates a case in which the measurement period is long, and FIG. 8(*b*) illustrates a case in which the measurement period is short. In both FIGS. 8(*a*) and (*b*), the top row shows the operations of the communication processing unit 22 of the main module 20, and the bottom row shows the operations of the measurement unit 12 of the measurement modules M1–M3. The horizontal axis shows the time.

In FIG. 8(*a*), the communication processing unit 22 sends a measurement-start command and performs polling for the duration of the measurement period T1, up until the next measurement-start command is sent. In addition, the measurement unit 12 of the measurement modules M1–M3 performs sequence measurement based on a measurement-start command, and outputs measurement data to the communication processing unit 22 through the communication processing unit 11 and serial bus SB together with the end of measurement. Note that because the measurement period T1 is long, the communication processing unit 22 receives measurement data from the measurement unit 12 during polling.

In contrast, in FIG. 8(*b*), the communication processing unit 22 sends a measurement-start command and performs polling for the duration of the measurement period T2 (T2<T1), up until the next measurement-start command is sent. In addition, the measurement unit 12 of the measurement modules M1–M3 performs sequence measurement based on a measurement-start command, and outputs measurement data to the communication processing unit 22 through the communication processing unit 11 and serial bus SB together with the end of measurement. However, because the measurement period T2 is short, the communication processing unit 22 receives measurement data regardless of the timing at which the next measurement-start command is sent. Thus, because the serial bus SB is a single system, the communication processing unit 22 is unable to send the next measurement-start command until reception of measurement data from the measurement module M1, allowing an error to occur in the measurement period T2.

Thus because the communication processing unit 22 of the main module 20 is unable to send the next measurement-start command until measurement data reception ends, it has not been possible to send a measurement-start command in the prescribed measurement period T2, which has been problematic. In particular, if multiple measurement modules are connected as in the case of a multi-point data acquisition apparatus, there are large amounts of measurement data to receive, and more errors occur in the measurement period T2, which has been a significant problem. Thus it has been difficult to engage in high-speed communication with multiple measurement modules, which has been problematic.

SUMMARY OF THE INVENTION

The present invention has the objective of realizing a multi-point data acquisition apparatus which enables high-speed communication with multiple measurement modules.

DETAILED DESCRIPTION OF THE PREFERRED EMBODIMENTS

Embodiments of the present invention are described below with reference to the figures.

(i) Case in Which the Main Module Transmits Data to the Measurement Modules M1–M3

First Embodiment

Figure 1:
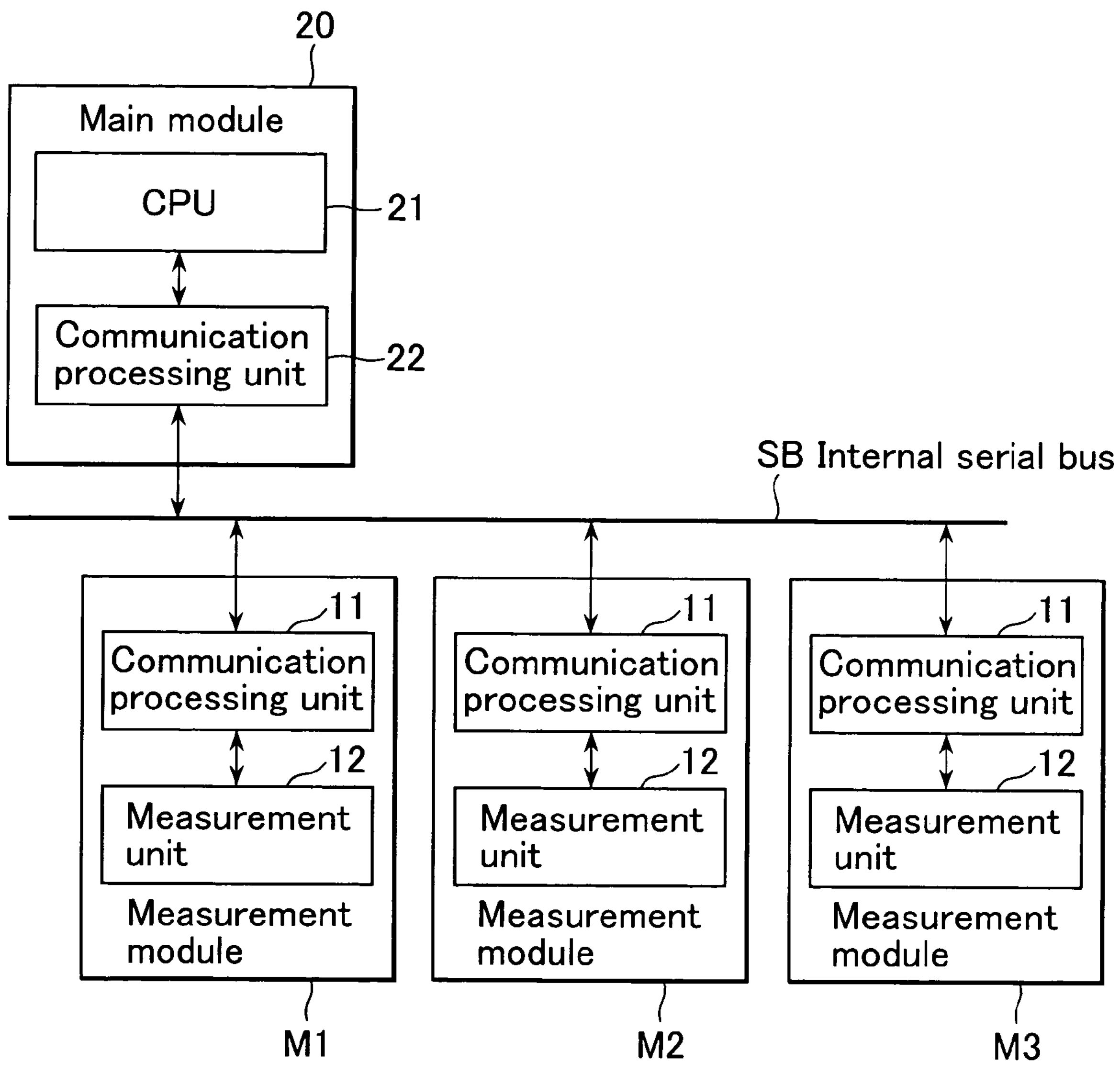
FIG.1 (Prior Art)
FIG. 1 is a block diagram of a prior art multi-point data acquisition apparatus.
Figure 2:
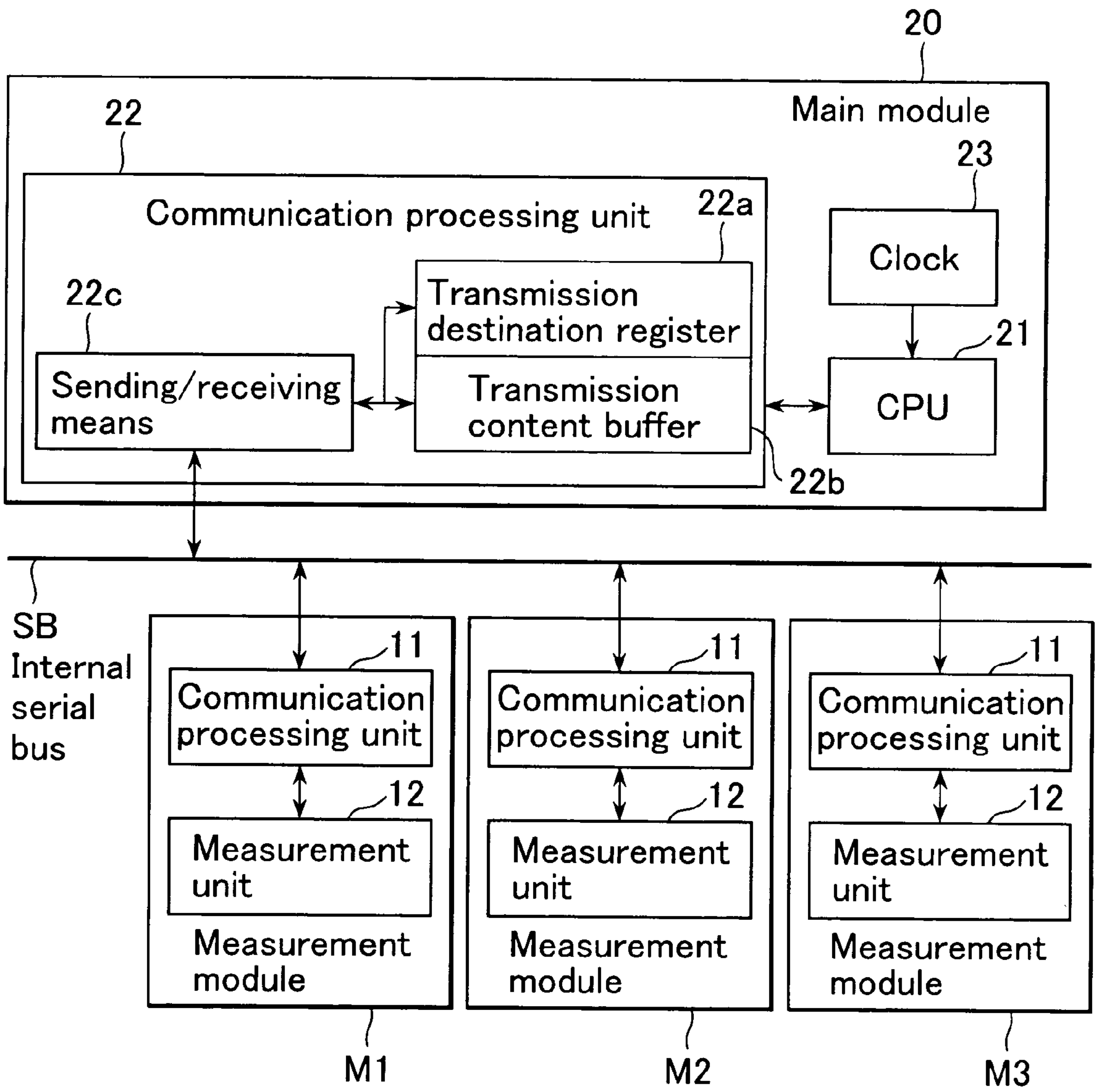
FIG.2 (Prior Art)
FIG. 2 is a diagram illustrating the detailed structure of the apparatus shown in FIG. 1.
Figure 9:
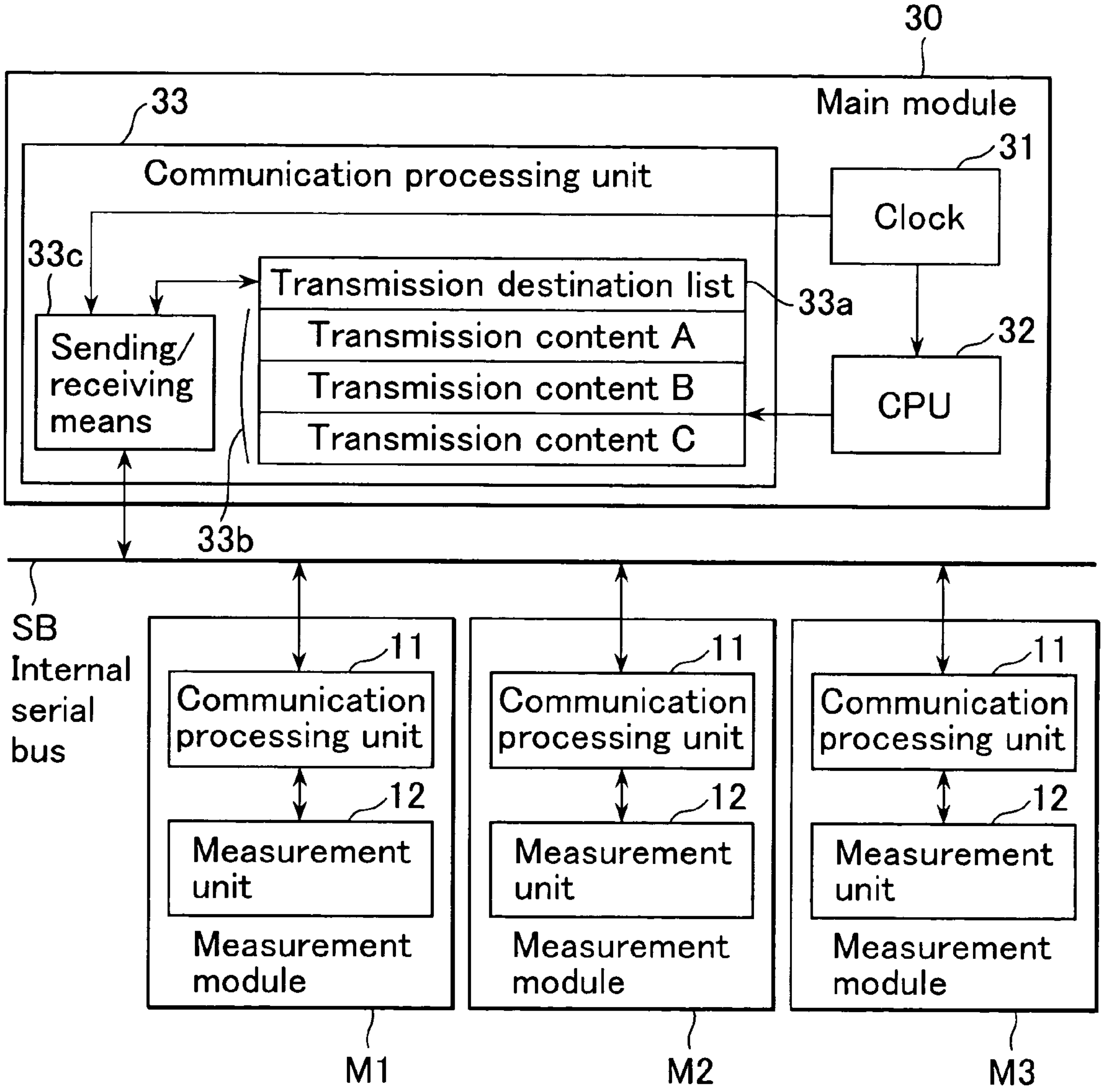
FIG. 9 is a block diagram illustrating the first embodiment of the present invention.

FIG. 9 is a block diagram illustrating the first embodiment of the present invention. Herein, items which are the same as in FIGS. 1 and 2 are denoted by the same symbols and not described. In addition, the structure pertaining to the explanation is illustrated and will be described.

In FIG. 9, a main module 30 is provided instead of the main module 20.

The main module 30 comprises a real-time clock 31, CPU 32, and communication processing unit 33, and is connected to the internal serial bus SB.

In addition, the main module 30 sends, to the measurement modules M1–M3 through the serial bus SB, commands for specifying measurement conditions, measurement-start, measurement-stop, and the like; collects (receives) measurement data from the measurement modules M1–M3; and the like, controlling the entire multi-point data acquisition apparatus. Furthermore, the main module 30 exchanges data with a PC (not shown) disposed externally.

The real-time clock 31 is a timing generating unit which simultaneously outputs an interrupt signal, which is the first timing signal, and a start signal, which is the second timing signal.

The CPU 32 is a setting unit which takes the interrupt signal from the real-time clock 31. In addition, the CPU 32 sets, in the communication processing unit 33, multiple transmission destinations, which are the measurement modules M1–M3 engaging in serial communication; and also sets the transmission content corresponding to each transmission destination.

The communication processing unit 33 comprises a transmission destination list register 33*a*, a transmission content buffer 33*b* which stores the transmission content for each of the measurement modules M1–M3, and a sending/receiving means 33*c*. It stores the multiple transmission destinations and multiple transmission contents set by the CPU 32, and in response to the start signal from the real-time clock 31, sequentially sends transmission contents through the serial bus SB to the multiple measurement modules M1–M3 which are set as transmission destinations, performing serial communication. Herein, the transmission destination list register 33*a* and transmission content buffer 33*b* are storage means.

The transmission destination list register 33*a* holds multiple transmission destinations set by the CPU 32. For example, if there are three measurement modules M1–M3 connected to the serial bus SB, the transmission destination list register 33*a* is a register with at least three bits. Each bit corresponds to a transmission destination, with the first bit corresponding to measurement module M1, the second bit to measurement module M2, and the third bit to measurement module M3. The transmission content buffer 33*b* holds the transmission contents A–C for each of the measurement modules M1–M3 set by the CPU 32 (the transmission contents A–C are commands such as measurement conditions, measurement-start, and measurement-stop).

The sending/receiving means 33*c* receives a start signal from the clock 31. In addition, based on the start signal, it reads the transmission destinations and transmission contents from the transmission destination list register 33*a* and transmission content buffer 33*b* respectively; sequentially sends the transmission contents through the serial bus SB to the multiple measurement modules M1–M3 set as transmission destinations; and receives serial data from the measurement modules M1–M3, performing serial communication.

The operations of such an apparatus will now be described.

The CPU 32 simultaneously sets multiple measurement modules which are requiring synchronized transmission among the measurement modules M1–M3 to the transmission destination list register 33*a* of the communication processing unit 33. For example, if all the measurement modules M1–M3 are to be used as transmission destinations, all of the bits of the transmission destination list register 33*a* are set to the High level: "111". If just the measurement modules M1 and M2 are to be used as transmission destinations, then the transmission destination list register 33*a* should be set to "110". Next, the CPU 32 sets transmission contents assigned for each of the measurement modules, such as measurement-start commands, to the transmission content buffer 33*b*.

Next, each time a start signal is input from the clock 31, the sending/receiving means 33*c* of the communication processing unit 33 checks the bits of the transmission destination list register 33*a*. If all of the bits are at the Low level, then the sending/receiving means 33*c* waits for the next start signal. If any of the bits is set to the High level, then it reads the transmission content corresponding to the High level bit from the transmission content buffer 33*b* and transmits it to the measurement module corresponding to the High level bit.

For example, if the bits are set to "111", the sending/receiving means 33*c* converts the transmission content to serial data and transmits it through the internal serial bus SB, starting with the measurement module M1, which is at the first bit. At this time, communication with the measurement module M1 is not connectionless; serial data to which a CRC or checksum has been added are transmitted to confirm whether the transmission content has been properly transmitted to the measurement module M1. If transmission fails, the serial data are resent.

Next, when communication with the measurement module M1 ends, the sending/receiving means 33*c* converts transmission content to serial data and sends it to the measurement module M2, which corresponds to the next bit. Likewise, when communication with the measurement module M2 ends, it performs transmission to the measurement module M3.

When transmission to the measurement modules M1–M3 which are set as transmission destinations ends, the communication processing unit 33 sets all of the bits of the transmission destination list register 33*a* to the Low level, erases the CPU 32 settings, and waits for the next start signal.

The communication processing unit 11 of the measurement modules M1–M3, for its part, extracts the measurement-start command from the received serial data and outputs it to the measurement unit 12. The measurement unit 12 then starts measurement.

It should be noted that because the start signal and interrupt signal are output from the clock 31 simultaneously, the times at which the CPU 32 sets the transmission destinations and transmission contents in the transmission destination list register 33*a* and transmission content buffer 33*b* respectively should be subsequent to the passage of the period of time required for the communication processing unit 33 to erase the settings after the interrupt signal is input to the CPU 32.

Thus, the communication processing unit 33 sequentially transmits transmission contents corresponding to transmission destinations for multiple measurement modules M1–M3 set in the transmission destination list register 33*a* in response to a start signal from the clock 31. For this reason, it is possible to start transmission simultaneous with the start signal and it is possible to reduce the transmission time difference between the measurement modules M1–M3, regardless of the load state of the CPU 32. Because of this, the main module 30 can communicate with multiple measurement modules M1–M3 at high speed. Therefore, even though more measurement modules M1–M3 are connected than in the apparatus shown in FIG. 2, in practical terms they can be regarded as performing synchronized measurements.

In addition, when communication with the measurement modules M1–M3 set as transmission destinations ends, the communication processing unit 33 clears the bits in the transmission destination list register 33*a* to erase the settings, so the CPU 32 does not need to erase the transmission destination list register 33*a* after receiving a communication-end notification. Because of this, it is possible to reduce the load on the CPU 32. Therefore, the CPU 32 can perform other processes in a stable condition.

In addition, because the CPU 32 simultaneously sets multiple measurement modules as transmission destinations, the CPU 32 only needs to perform settings once, regardless of the number of measurement modules being set, even if the measurement interval for performing measurement is different for each of the measurement modules M1–M3 and the number of modules treated as transmission destinations differs for each setting. This makes it possible to set the load on the CPU 32 to a fixed level. Therefore, the CPU 32 can perform other processes in a stable condition.

Second Embodiment

Figure 10:
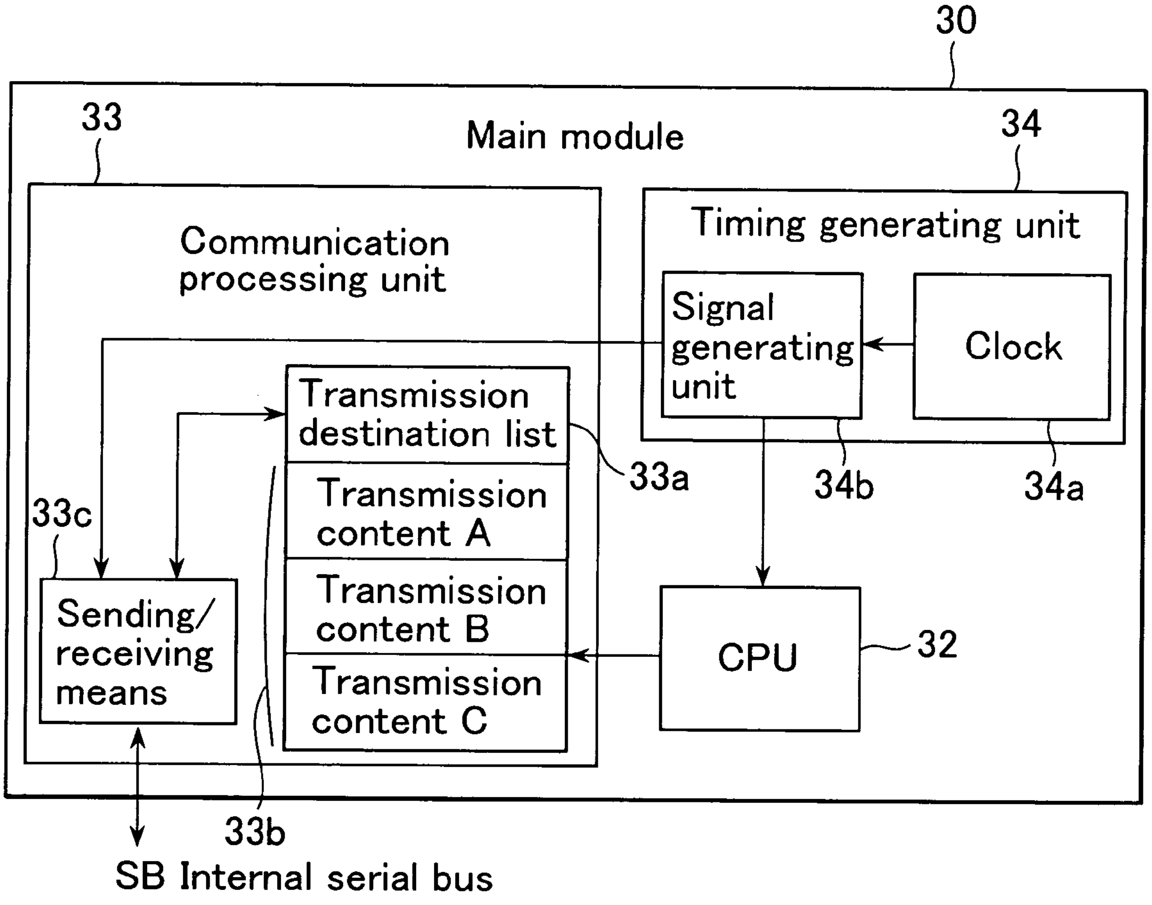
FIG. 10 is a block diagram illustrating the second embodiment of the present invention.

The apparatus shown in FIG. 9 is structured so that the real-time clock 31 outputs a start signal and an interrupt signal. However, it is also permissible to provide a timing generating unit 34 instead of the real-time clock 31. More specifically, this is structured as shown in FIG. 10. FIG. 10 is a block diagram illustrating the second embodiment of the present invention. Herein, items which are the same as in FIG. 9 are not described, and the serial bus SB and measurement modules M1–M3 are not illustrated.

In FIG. 10, the timing generating unit 34 comprises a real-time clock 34*a* and signal generating means 34*b*; it outputs an interrupt signal, which is the first timing signal, to the CPU 32 and a start signal, which is the second timing signal, to the communication processing unit 33.

The real-time clock 34*a* outputs a clock signal at prescribed time intervals. The signal generating means 34*b* receives the clock signal from the real-time clock 34*a* as input, and outputs the interrupt signal and start signal to the CPU 32 and communication processing unit 33, using this clock signal as a reference;

Such an apparatus is similar to the apparatus shown in FIG. 9, but its operations differ in that the signal generating means receives a clock signal as input from the real-time clock 34*a* at prescribed time intervals, such as at one-second intervals. Next, the signal generating means 34*b* outputs the interrupt signal and start signal at different prescribed time intervals, such as at 100-ms intervals, using this clock signal as a reference.

Thus, because the signal generating means 34*b* outputs the interrupt signal and start signal at prescribed time intervals using the clock signal from the real-time clock 34*a* as a reference, it is possible to transmit the transmission contents to the measurement modules M1–M3 without relying on the time interval of the clock signal from the real-time clock 34*a*.

More specifically, the time interval of the clock signal output from the real-time clock 34*a* is often one year, one month, one day, one hour, one minute, one second, ½ second, ¼ second, ⅛ second, 1/16 second, and so on, and cannot be set to a prescribed time interval such as 100 ms. In addition, the minimum time interval is often set to one second in inexpensive off-the-shelf products, making it difficult to transmit the transmission contents to the measurement modules M1–M3 at a prescribed time interval. However, in the apparatus shown in FIG. 10, because the signal generating means 34*b* outputs the interrupt signal and start signal at prescribed time intervals using the clock signal from the real-time clock 34*a* as a reference, it is possible to transmit the transmission contents to the measurement modules M1–M3 at prescribed time intervals without relying on the time interval of the clock signal from the real-time clock 34*a*.

It should be noted that the present invention is not limited to the above, but may also be as described below.

(i-1) The apparatus shown in FIG. 10 is structured so that the signal generating means 34*b* outputs the interrupt signal and start signal at the same time interval. However, it is also permissible to output the interrupt signal and start signal at different time intervals. For example, settings may be set so that a start signal is output once to the communication processing unit 33 before an interrupt signal is output ten times to the CPU 32. In this case, the signal generating means 34*b* counts the number of times an interrupt signal is output after the start signal is output, and holds the count value. The CPU 32 should check the count value of the signal generating means 34*b* each time an interrupt signal is input, and reference this count value in setting the transmission destinations and transmission contents in the transmission destination list register 33*a* and transmission content buffer 33*b* respectively.

(i-2) The apparatuses shown in FIGS. 9 and 10 are structured so that there are three measurement modules M1–M3. However, it is also permissible to provide multiple measurement modules. With respect to the transmission destinations and transmission contents set in the storage unit as well, at least two measurement modules should be set as transmission destinations, and transmission destinations corresponding to them should be set.

Figure 11:
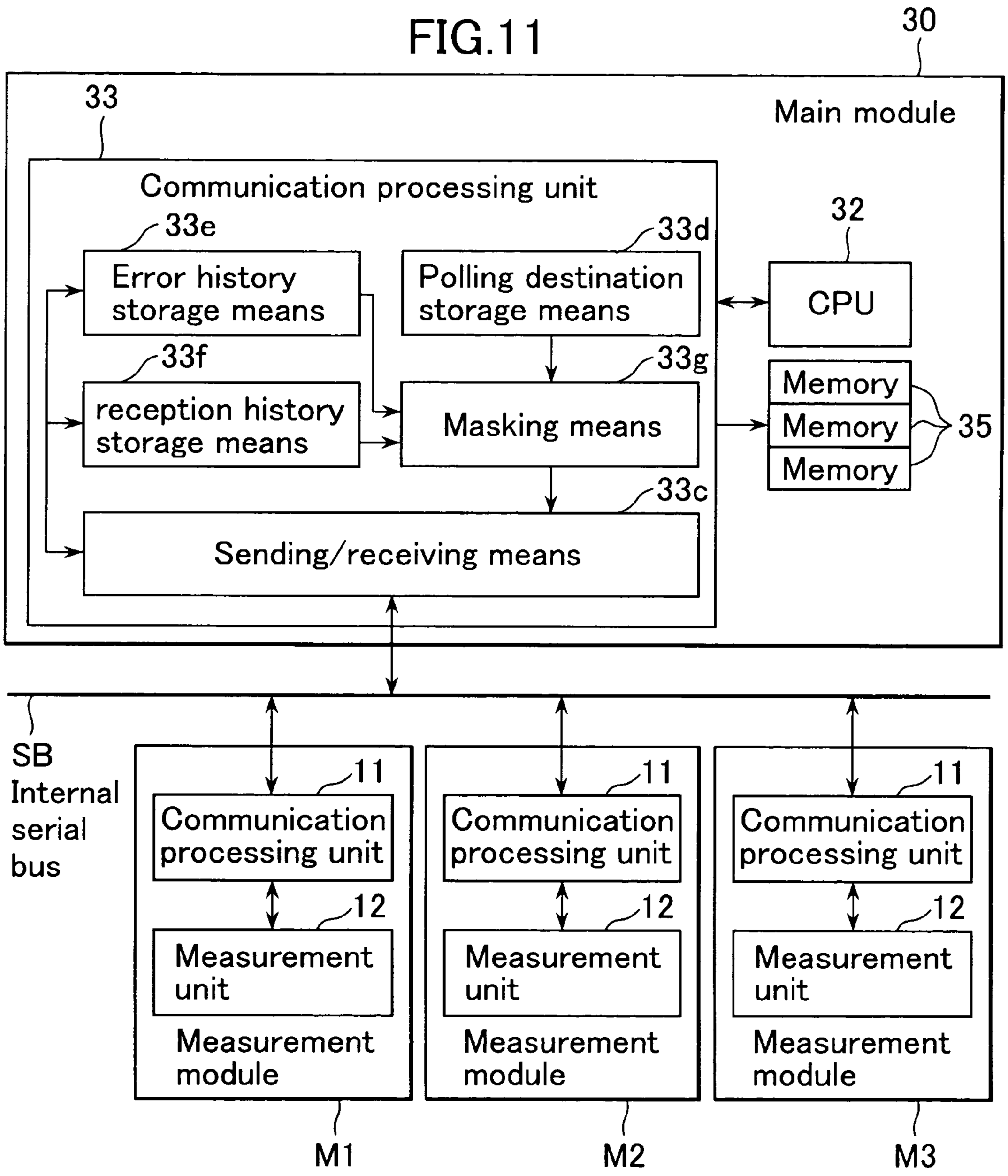
FIG. 11 is a block diagram illustrating the third embodiment of the present invention.

(ii) Case in Which the Main Module Receives Data from the Measurement Modules M1–M3 by Polling Third Embodiment FIG. 11 is a block diagram illustrating the third embodiment of the present invention. Herein, items which are the same as in FIG. 9 are denoted by the same symbols and not described. In addition, the structure pertaining to the explanation is illustrated and will be described.

In FIG. 11, the main module 30 comprises a CPU 32 and communication processing unit 33, and memories 35 are newly provided. In addition, the main module 30 is connected to the internal serial bus SB. In addition, the main module 30 sets measurement conditions, provides measurement-start and measurement-end instructions, collects measurement data, and the like, with the measurement modules M1–M3 through the serial bus SB, controlling the entire multi-point data acquisition apparatus. Furthermore, the main module 30 exchanges data with a PC (not shown) disposed externally.

The CPU 32 is a setting unit, which outputs commands to the prescribed measurement modules M1–M3, and sets polling destinations for causing reception of data corresponding to the output commands.

The communication processing unit 33 comprises a sending/receiving means 33*c*, polling destination storage means 33*d*, error history storage means 33*e*, reception history storage means 33*f*, and masking means 33*g*, and is connected to the internal serial bus SB. In addition, the communication processing unit 33 converts commands output from the CPU 32 to serial data, engages in serial communication with prescribed measurement modules M1–M3 through the internal serial bus SB, and when serial communication is completed, notifies the CPU 32 of the end of communication. In addition, it collects data by polling the polling destination set by the CPU 32, stores the received data in the memories 35, and notifies the CPU 32 of reception.

The polling destination storage means 33*d*, following the settings from the CPU 32, stores the polling destinations, i.e., the measurement modules M1–M3 from which data are to be collected by polling. The error history storage means 33*e* stores measurement modules in which communication does not end normally (e.g., cases in which there is no communication response, or an error is recognized in a CRC check). The reception history storage means 33*f* stores measurement modules M1–M3 for cases communication ends normally and data have been added to the response from the measurement modules M1–M3.

Herein, the error history storage means 33*e* and reception history storage means 33*f* are communication history storage units. In cases where communication does not end in the normal procedure for the content of communication with the polled measurement modules M1–M3, or communication ends in the normal procedure and data have been added to the response, they store the measurement module M1–M3 making this communication as communication history.

The masking means 33*g* is a selection means. It reads the polling destination from the polling destination storage means 33*d*, reads the communication history from the error history storage means 33*e* and reception history storage means 33*f*, and masks and selects a measurement module M1–M3 having no communication history from the polling destinations.

The sending/receiving means 33*c*, following instructions from the CPU 32, sends commands to the measurement modules M1–M3 through the internal serial bus SB; collects data by polling the measurement modules M1–M3 which have been selected by the masking means 33*g*; and stores, in the error history storage means 33*e* and reception history storage means 33*f*, the communication history based on the communication contents when these data are collected.

The memory 35 is a received-data storage unit disposed in each of the measurement modules M1–M3. It stores data received by polling from each of the measurement modules M1–M3.

The operations of such an apparatus will now be described.

Figure 12:
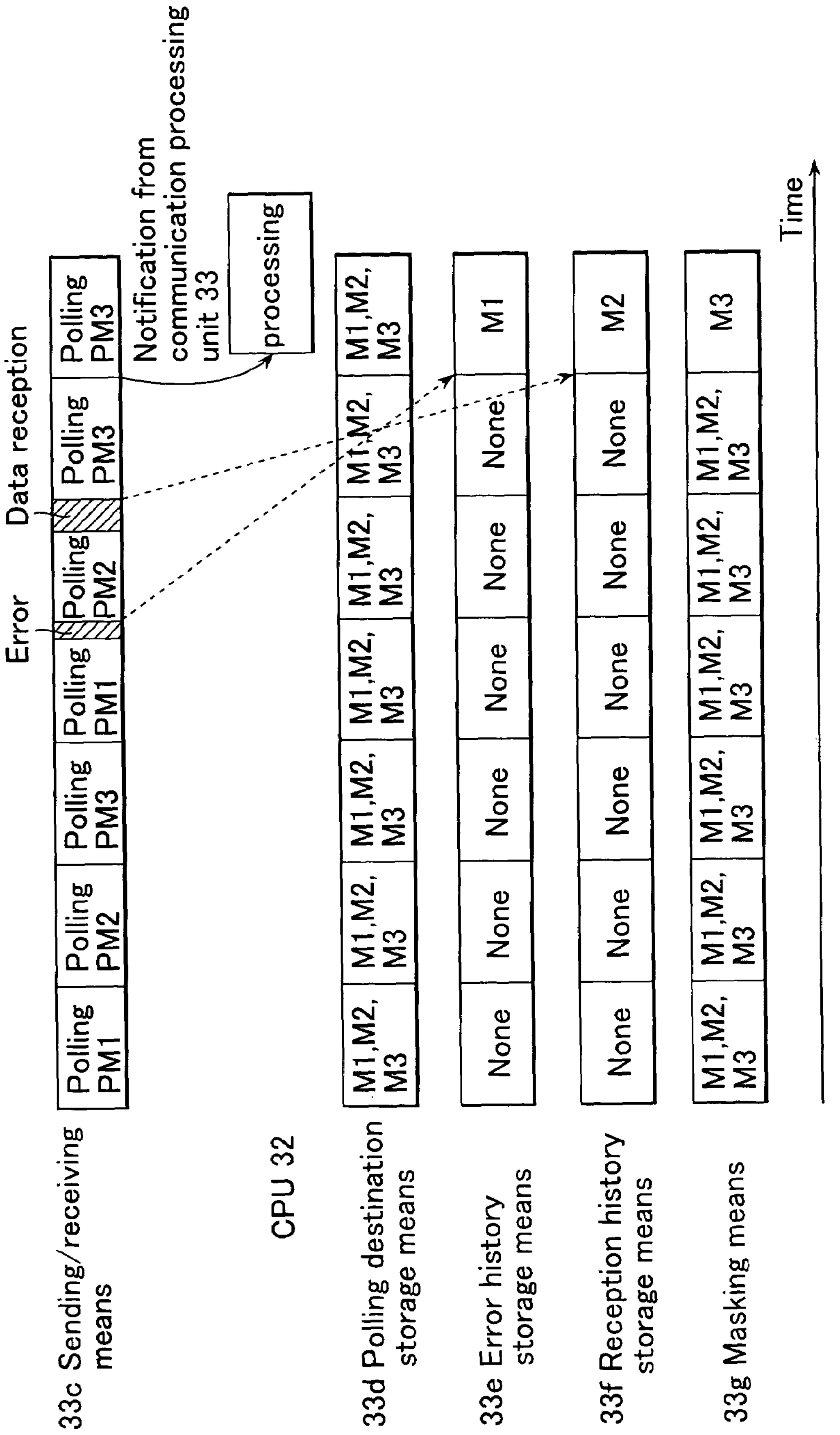
FIG. 12 is a diagram illustrating an example of the operations of the apparatus shown in FIG. 11.

As an example, operations will be described for a case in which the main module 30 causes the measurement modules M1–M3 to perform measurements and collects measurement data. FIG. 12 is a diagram illustrating an example of the operations of the apparatus shown in FIG. 11. In FIG. 12, the very top row shows the operations of the sending/receiving means 33*c*; the second row from the top shows the operations of the CPU 32; the third row from the top shows the information stored by the polling destination storage means 33*d*; the fourth row from the top shows the information stored by the error history storage means 33*e*; the fifth row from the top shows the information stored by the reception history storage means 33*f*; and the sixth row shows the measurement modules M1–M3 which are masked and selected as new polling destinations by the masking means 33*g*. The horizontal axis shows the time.

The CPU 32 of the main module 30 outputs a measurement-start command to the communication processing unit 33 with the measurement module M1 set as the transmission destination. In response to this, the sending/receiving means 33*c* of the communication processing unit 33 converts the command from the CPU 32 to serial data and sends the serial data through the internal serial bus SB to the measurement module M1 (the transmission destination), performing serial communication. It should be noted that serial communication is not connectionless; serial data to which a CRC or checksum has been added are transmitted to confirm whether the transmission content has been properly transmitted to the measurement module M1. If transmission fails, the serial data are resent. Next, when serial communication with the measurement module M1 ends, the communication processing unit 33 notifies the CPU 32 of the end of communication.

When command transmission to the measurement module M1 ends, thereafter in the same manner, the CPU 32 instructs the communication processing unit 33 to send a command to the measurement module M2, and the communication processing unit 33 engages in communication with the measurement module M2. Next, when command transmission to the measurement module M2 ends, the CPU 32 instructs the communication processing unit 33 to send a command to the measurement module M3, and the communication processing unit 33 engages in communication with the measurement module M3.

When measurement-start command transmission to the measurement modules M1–M3 ends, the CPU 32 causes the polling destination storage means 33*d* of the communication processing unit 33 to store the measurement modules M1–M3 as polling destinations, and causes the sending/receiving means 33*c* to start collecting data by polling. At this time, the communication processing unit 33 clears the communication histories of the error history storage means 33*e* and reception history storage means 33*f*.

Next, the masking means 33*g* reads the polling destination from the polling destination storage means 33*d*; reads the communication histories from the error history storage means 33*e* and reception history storage means 33*f*; and masks the measurement modules M1–M3 with communication histories to select measurement modules M1–M3 with no communication history from the polling destination measurement modules M1–M3. In this case, the error history storage means 33*e* and reception history storage means 33*f* have just been cleared, so the polling destinations after the selection has been made are measurement modules M1–M3. It should be noted that this masking may be performed constantly, or may be performed immediately before reading by the sending/receiving means 33*c*.

Next, the sending/receiving means 33*c* reads the polling destinations selected by the masking means 33*g* and collects data by sequentially polling the measurement modules M1–M3.

The operations of the measurement modules M1–M3 will now be described.

The communication processing unit 11 of the measurement modules M1–M3 extracts the measurement-start command from the received serial data and outputs it to the measurement unit 12. The measurement unit 12, following this measurement-start command, measures the measurement subject and outputs the measurement data from the measurement to the communication processing unit 11.

Next, the communication processing unit 11 of the measurement modules M1–M3 adds the measurement data to the response to data collection by polling from the sending/receiving means 33*c* of the main module 30 and performs transmission.

The operations of the main module 30 will now again are described.

The sending/receiving means 33*c* of the communication processing unit 33 sequentially performs polling PM1, polling PM2, and polling PM3 on the measurement modules M1–M3. In polling PM1–PM3 if communication ends in the normal procedure for the communication content, and no measurement data have been added to the response from the measurement modules M1–M3, then the error storage means 33*e* and reception history means 33*f* remain cleared of contents, and the polling destinations after masking by the masking means 33*g* remain the measurement modules M1–M3.

When a single cycle of polling PM1–PM3 is completed, the sending/receiving means 33*c* again reads the polling destinations from the masking means 33*g* and performs polling PM1–PM3 in the same manner. Herein, if communication does not end in the normal procedure for the communication content in polling PM1, and if communication does end in the normal procedure for the communication content in polling PM2 and measurement data have been added to the response from the measurement module M2, then after the sending/receiving means 33*c* completes a single cycle of polling PM1–PM3, the name of the measurement module in which communication did not end in the normal procedure and an error occurred, i.e., the measurement module M1, is stored in the error history storage means 33*e*; and the name of the measurement module in which measurement data were added to the communication response, i.e., the measurement module M2, is stored in the reception history storage means 33*f*. Because of this, the only polling destination after masking by the masking means 33*g* is the measurement module M3.

In addition, the communication processing unit 33 stores the error content in polling PM1 and the received data in polling PM2 in the memory 35 corresponding to the individual measurement modules M1 and M2, and notifies the CPU 32 when a single cycle of polling PM1–PM3 is completed. In response to this, the CPU 32 provides measurement data signal processing instructions to a signal processing unit (not shown). It should be noted that a separate, dedicated storage means may be provided in the communication processing unit 33 and the error content may be stored in it.

Next, after a single cycle of polling PM1–PM3, the sending/receiving means 33*c* stores the communication history, reads the polling destination from the masking means 33*g*, and performs polling PM3 only. Furthermore, polling PM3 is repeated until communication with the measurement module M3 cannot end in the normal procedure, or there is a response to which measurement data have been added from the measurement module M3. It should be noted that in cases where the restoration of the measurement module M1 where the communication error occurred is confirmed, and in cases where data processing of the received measurement data ends, the CPU 32 may clear the applicable measurement modules M1 and M2 from the error history storage means 33*e* and reception history storage means 33*f*, and cause the sending/receiving means 33*c* to resume polling PM1–PM3.

Thus, the masking means 33*g* reads the measurement modules M1–M3 which are polling destinations from the polling destination storage means 33*d*, and reads, from the error history storage means 33*e*, the measurement modules M1–M3 in which communication did not end in the normal procedure, and, from the reception history storage means 33*f*, the measurement modules M1–M3 in which communication did end in the normal procedure and measurement data were added to the response from the measurement modules M1–M3, performing masking; and performs polling PM1–PM3 only with respect to the measurement modules M1–M3 in which communication ended in the normal procedure but measurement data were not added to the response. Because of this, it is possible to perform polling efficiently, and the main module 30 can engage in high-speed communication with multiple measurement modules M1–M3. Therefore, it is possible to receive data at high speed from multiple measurement modules M1–M3.

Figure 3:
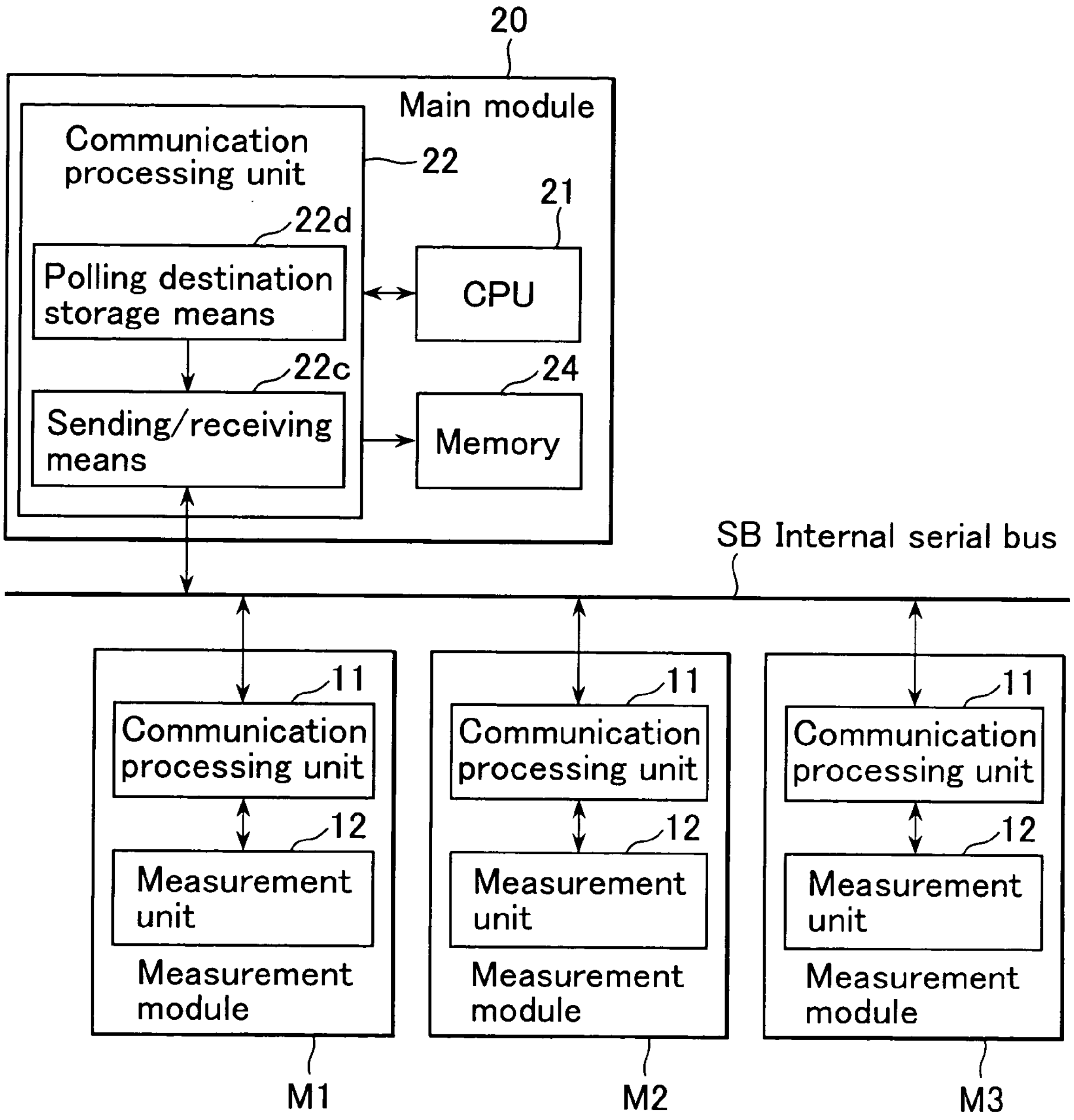
FIG.3 (Prior Art)
FIG. 3 is a diagram illustrating the detailed structure of the apparatus shown in FIG. 1.
Figure 4:
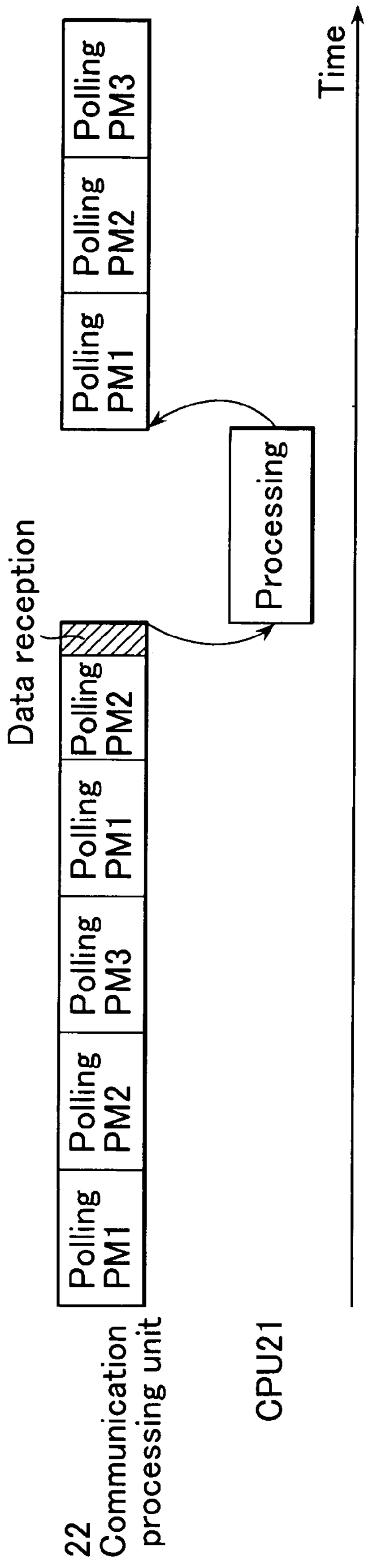
FIG.4 (Prior Art)
FIG. 4 is a diagram illustrating an example of the operations in the apparatus shown in FIG. 3.

In addition, because separate memories 35 are disposed in the individual measurement modules M1–M3, and errors and received data from the individual measurement modules M1–M3 are stored in the respective memories 35 and the CPU 32 is notified after the completion of a single polling cycle, it is not necessary to stop data collection by polling PM1–PM3 each time when there is a case where communication ends in the normal procedure and measurement data have been added to the response from the measurement modules M1–M3, or a case where communication does not end normally. More specifically, with the apparatus shown in FIG. 3, each time there is a data reception from any of the measurement modules M1–M3, unless data collection by polling PM1–PM3 is stopped and the CPU 32 processes the data, there is a possibility that previously collected data will be corrupted by the data collected from the next of the measurement modules M1–M3. However, because separate memories 35 are disposed in each of the measurement modules M1–M3, it is possible to receive data from a different measurement module M1–M3 while processing data, thus making it possible to increase data processing efficiency. This means it is possible to receive data at high speed from multiple measurement modules. In addition, it is possible to reduce the load on the CPU 32, and the CPU 32 can give priority to other processes.

It should be noted that the present invention is not limited to the above, but may also be as described below.

(ii-1) A structure was presented wherein, when a single cycle of polling PM1–PM3 for the polling destinations selected by the masking means 33*g* is completed, the sending/receiving means 33*c* stores the measurement modules M1–M3 with communication errors in the error history storage means 33*e*, and stores the measurement modules M1–M3 in which measurement data were added to the response from the measurement modules M1–M3 in the reception history storage means 33*f*. However, it is also permissible to structure this so that each time such communication contents occur, the communication histories of the measurement modules M1–M3 are stored in the error history storage means 33*e* and reception history storage means 33*f*.

Figure 13:
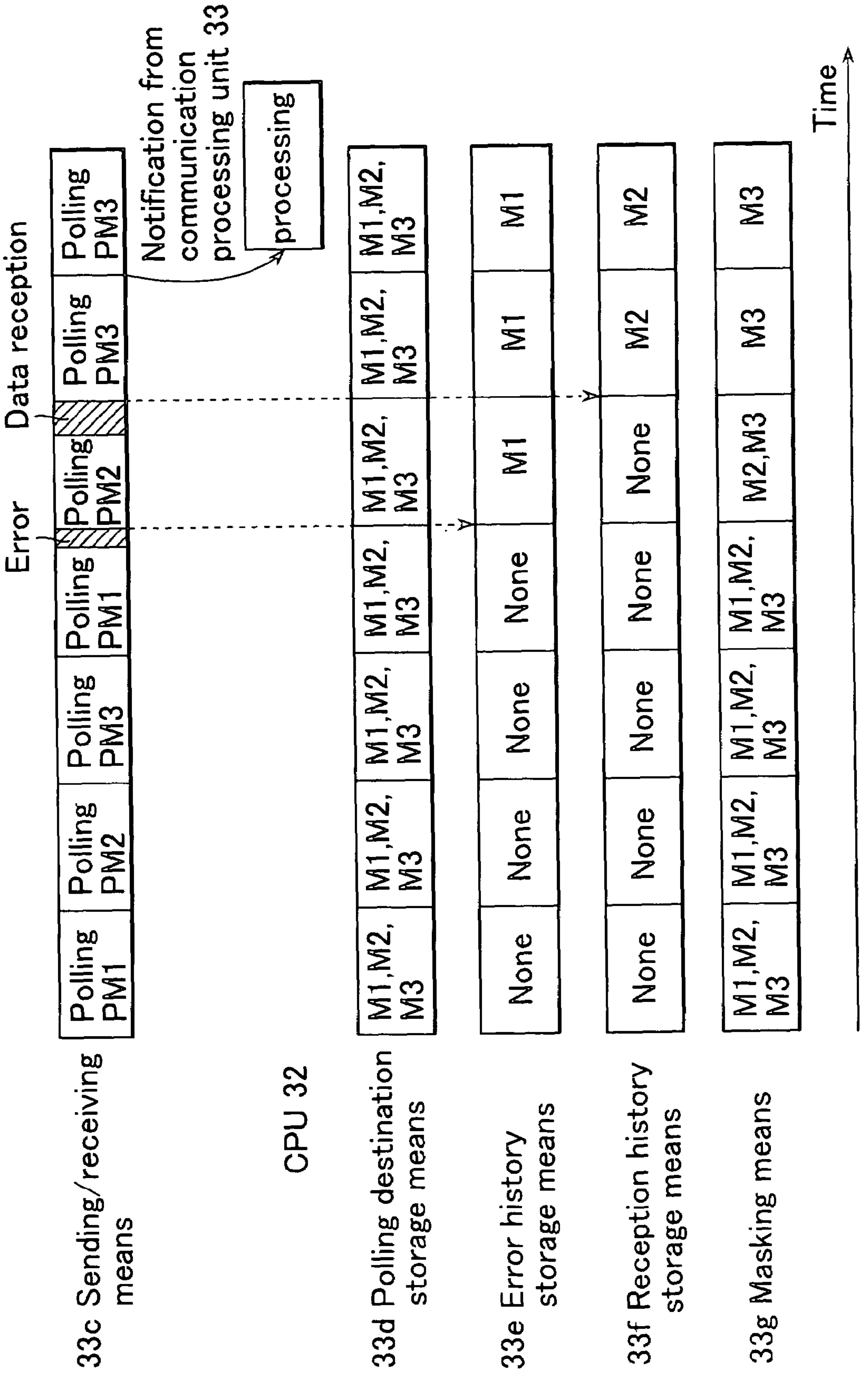
FIG. 13 is a diagram illustrating another example of the operations of the apparatus shown in FIG. 11.

More specifically, the sending/receiving means 33*c* operates as shown in FIG. 13. Items which are the same as in FIG. 12 are denoted by the same symbols and not described. The operations are nearly the same as in FIG. 12, but differ in that if communication does not end in the normal procedure in polling PM1, the sending/receiving means 33*c* stores, in the error history storage means 33*e*, the name of the measurement module where the error occurred, in this case the measurement module M1, simultaneous with the end of this polling PM1. In addition, in polling PM2, if communication ends in the normal procedure and measurement data have been added to the response from the measurement module M2, the sending/receiving means 33*c* stores, in the reception history storage means 33*f*, the name of the measurement module with the data reception, in this case the measurement module M2, simultaneous with the end of the polling PM2.

Of course, after the measurement module M1 is stored in the error history storage means 33*e*, the masking means 33*g* selects measurement modules M2 and M3 as polling destinations, and after the measurement module M2 is stored in the reception history storage means 33*f*, it selects only measurement module M3 as a polling destination. It should be noted that the CPU 32 may be notified each time there is a case where communication does not end in the normal procedure or a case where communication ends in the normal procedure but measurement data have been added to the response from the measurement module M2.

(ii-2) The memory 35 was structured separately in each of the measurement modules M1–M3, but it is also permissible to use a large-capacity continuous memory, and to assign the start of this memory as the successor to the end of this continuous memory, thereby structuring it in ring form so as to use as a ring buffer, the end of which is apparently eliminated.

(ii-3) The masking means 33*g* was structured so as to read the measurement modules M1–M3 with errors from the error history storage means 33*e*, and to read the measurement modules M1–M3 with received data from the reception history storage means 33*f*, and select polling destinations by both of these storage means. However, it may also be structured so as to read from either the error history storage means 33*e* or the reception history storage means 33*f*, and selects polling destinations by both of these storage means.

(ii-4) The main module 30 was structured so as to send a measurement-start command to the measurement modules M1–M3 and collect measurement data by polling. However, it is also permissible for it to transmit commands for changing measurement condition (e.g., measurement unit 12 range settings and sampling intervals), then perform polling and collect data from the measurement unit 12 indicating that measurement condition setting has ended. Thus, it may be applied to a structure wherein data, which is in response to commands sent by the main module 30, are collected from the measurement modules M1–M3 by polling.

(ii-5) In the apparatus shown in FIG. 11, a structure was presented wherein there are three measurement modules M1–M3, but any prescribed number of measurement modules may be provided.

(iii) Case in Which the Main Module Engages in Data Sending and Receiving with Measurement Modules

Fourth Embodiment

Figure 14:
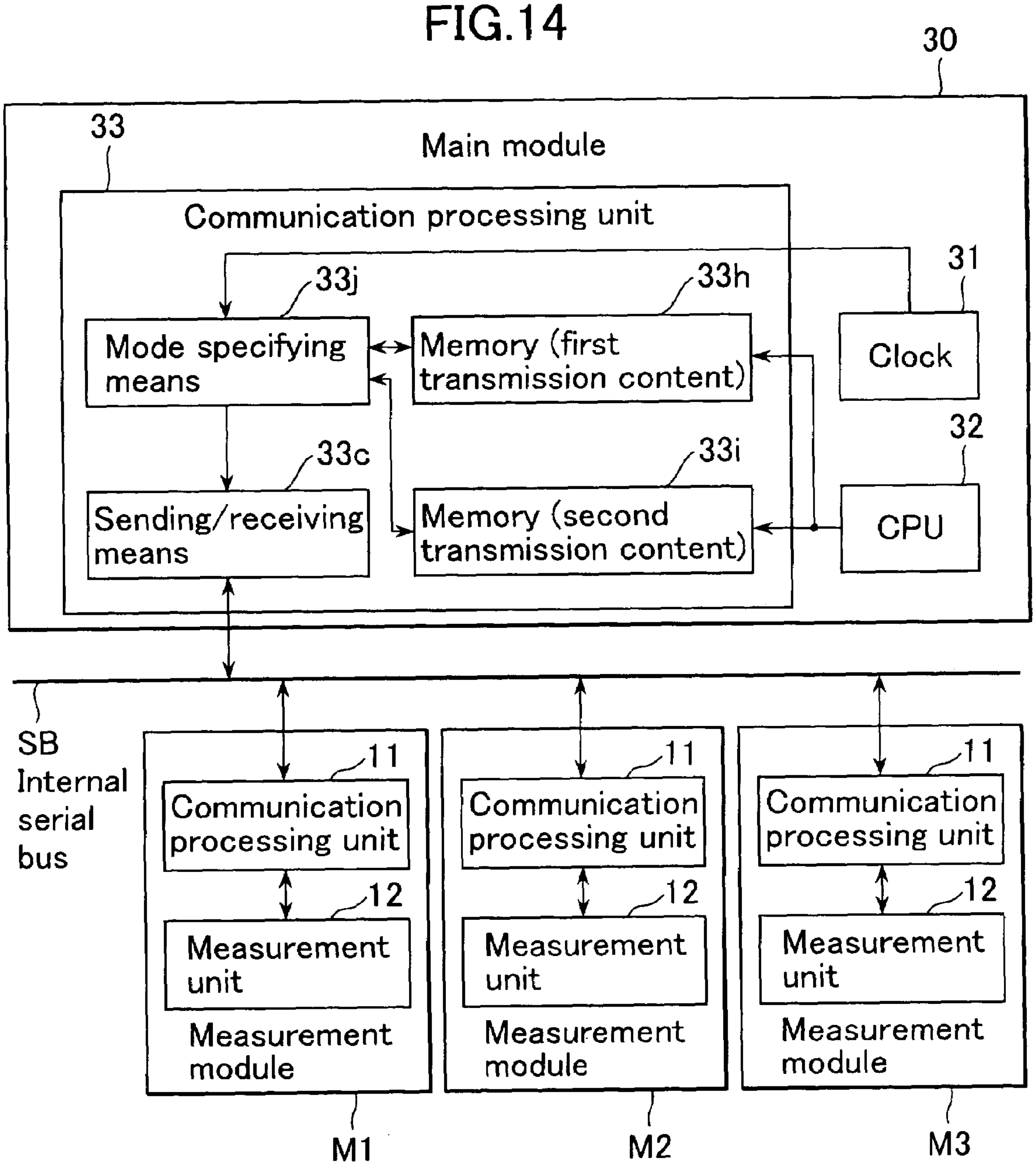
FIG. 14 is a block diagram illustrating the fourth embodiment of the present invention.

FIG. 14 is a block diagram illustrating the fourth embodiment of the present invention. Herein, items which are the same as in FIGS. 9 and 11 are denoted by the same symbols and not described. In addition, the structure pertaining to the explanation is illustrated and will be described.

In FIG. 14, the main module 30 comprises a clock 31, CPU 32, and communication processing unit 33, and is connected to the internal serial bus SB. In addition, the main module 30 sets measurement conditions, provides measurement-start and measurement-stop instructions, collects measurement data, and the like, with the measurement modules M1–M3 through the serial bus SB, controlling the entire multi-point data acquisition apparatus. Furthermore, the main module 30 exchanges data with a PC (not shown) disposed externally.

The clock 31 is a timing generating unit which outputs timing signals at prescribed periods. The CPU 32 is a setting unit which sets, as transmission destinations, one or more prescribed measurement modules M1–M3 among the multiple measurement modules M1–M3, and sets the transmission contents for these transmission destinations. It should be noted that there are two types of transmission content: transmission content which must be sent at a prescribed transmission interval, and for which timing is important (the first transmission content, such as measurement-start commands and measurement-stop commands); and transmission content for which timing is not very important (the second transmission content, such as measurement condition settings and sequence settings). In addition, the transmission destination to which the first transmission content is sent may be different from the transmission destination to which the second transmission content is sent.

The communication processing unit 33 comprises a sending/receiving means 33*c*, memory 33*h*, memory 33*i*, and mode specifying means 33*j*; it sequentially polls multiple measurement modules including the measurement modules M1–M3 and receives data. In addition, the communication processing unit 33 sends the transmission content set by the CPU 32 to the prescribed measurement modules M1–M3 set as transmission destinations by the CPU 32, based on a timing signal output from the clock 31.

The memory 33*h* is a first storage means which stores the first transmission content from the CPU 32, as well as the transmission destinations to which this transmission content is to be sent. The memory 33*i* is a second storage means which stores the second transmission content from the CPU 32, as well as the transmission destinations to which this transmission content is to be sent. In addition, the first storage means can hold two or more transmission destinations including measurement modules M1–M3, as well as the first transmission content for each of these transmission destinations. Thus the transmission destination list register 33*a* and transmission content buffer 33*b* in the apparatus shown in FIG. 9 should be used.

The mode specifying means 33*j* reads the first transmission content and transmission destination as well as the second transmission content and transmission destination from the memory 33*h* and memory 33*i*, respectively. In addition, it receives a timing signal from the clock 31 as input, and based on this timing signal, outputs polling instructions, the first transmission content, second transmission content and transmission destinations.

The sending/receiving means 33*c* is connected to the serial bus SB. It polls and receives data from the measurement modules M1–M3, following polling instructions from the mode specifying means 33*j*. In addition, the sending/receiving means 33*c* converts the first transmission content and serial communication, which are output from the mode specifying means 33*j*, to serial data, and sends them to the measurement modules M1–M3 which are transmission destinations.

The operations of such an apparatus will now be described.

First, the operations of the CPU 32 of the main module 30 will be described. The CPU 32 first sets, in the communication processing unit 33, the measurement modules M1–M3 to be polled when, for example, the apparatus is initialized, or after the measurement-start command transmission to the measurement modules M1–M3. Herein, a case will be described in which the polling destination is set during initialization.

After initialization ends, the CPU 32 stores the first transmission content in the memory 33*h* of the communication processing unit 33, with the prescribed measurement module M1–M3 set as the transmission destination. In addition, it sets the second transmission content in the memory 33*i* of the communication processing unit 33, with the prescribed measurement module M1–M3 set as the transmission destination. It should be noted that the timings for storage in the memories 33*h* and 33*i* may be based on a timing signal output by the clock 31, or may be based on a signal from a clock (not shown) which is provided separately from the clock 31 and synchronized with the clock 31.

Figure 15:
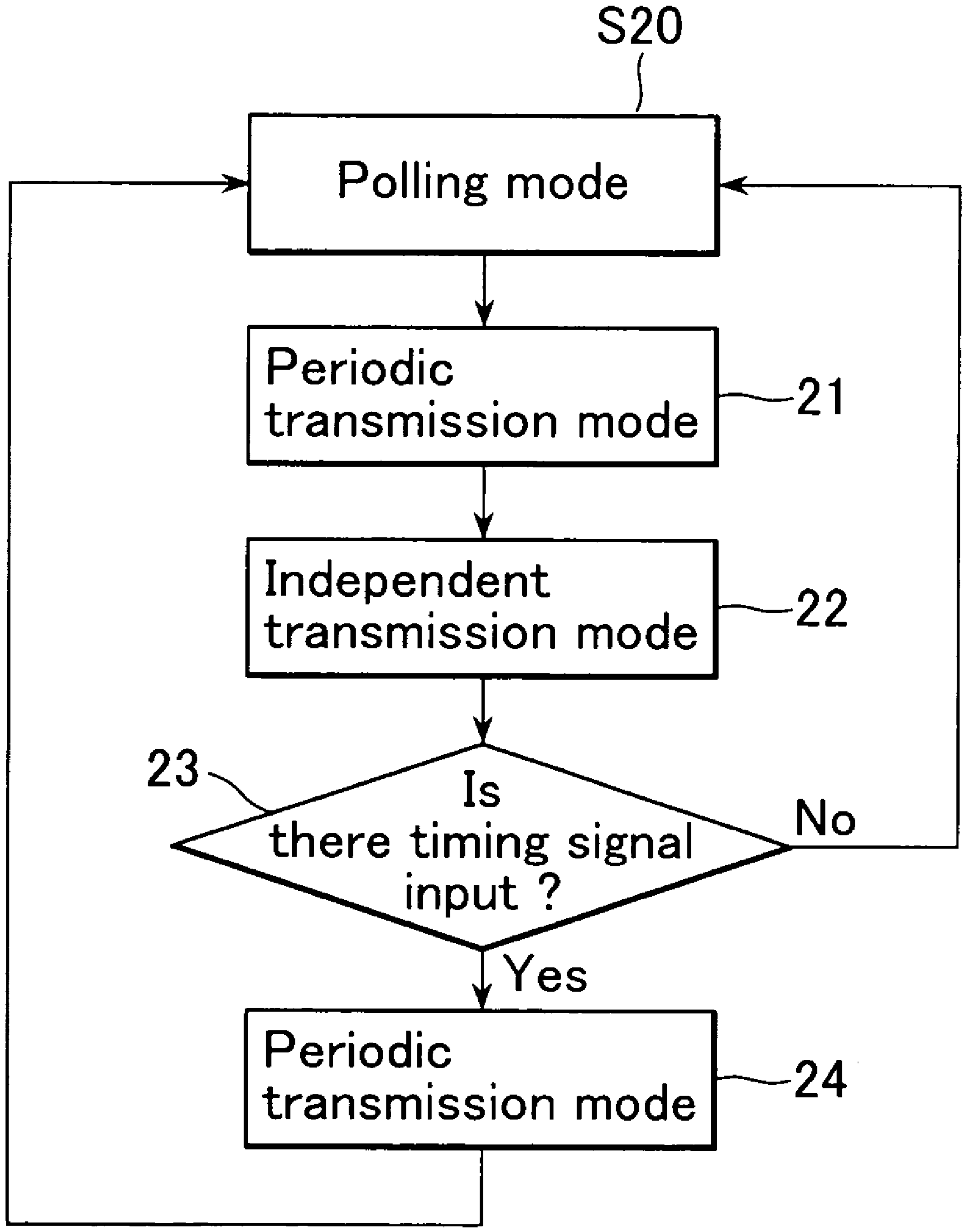
FIG. 15 is a flowchart illustrating the state transitions of a mode specifying means 33*j*.

Next, the operations of the communication processing unit 33 of the main module 30 will be described. FIG. 15 is a flowchart illustrating the state transitions of the mode specifying means of the communication processing unit 33.

The mode specifying means 33*j* of the communication processing unit 33 normally cycles repeatedly and sequentially through polling mode (S20), periodic transmission mode (S21), which is the first transmission mode, and independent transmission mode (S22), which is the second transmission mode. It should be noted that when a timing signal is input from the clock 31 in independent transmission mode, the mode changes to polling mode (S23, S24). After transmission ends, the normal sequence (S20–S23) is returned to.

The operations of each mode will now be described in detail.

In polling mode (S20), the mode specifying means 33*j* specifies polling PM1–PM3 to the sending/receiving means 33*c*. In response to this, the sending/receiving means 33*c* sequentially performs polling PM1, polling PM2, and polling PM3 with respect to the measurement modules M1–M3.

In periodic transmission mode (S21), if a timing signal has been input to the mode specifying means 33*j* before entering this mode, then the mode specifying means 33*j* reads the transmission destination and first transmission content from the memory 33*h*, outputs the transmission destination and first transmission content to the sending/receiving means 33*c*, and causes it to perform transmission to the measurement modules M1–M3 set by the CPU 32. It should be noted that if no transmission destination and transmission content are stored in the memory 33*h*, the mode specifying means 33*j* quickly changes to the next mode-independent transmission mode (S22)—without outputting anything to the sending/receiving means 33*c*.

In addition, if a timing signal has been input during polling mode (S20), the mode specifying means 33*j* causes the sending/receiving means 33*c* to cancel polling PM1–PM3 and changes to periodic transmission mode (S21). In addition, if a timing signal has been input during independent transmission mode (S22), the mode specifying means 33*j* waits for the end of independent transmission mode and changes to periodic transmission mode (S24).

The sending/receiving means 33*c* converts the transmission destination and transmission content output from the mode specifying means 33*j* to serial data, and sends them to the prescribed measurement modules M1–M3 through the serial bus SB. Of course, as in prior art apparatuses, serial communication with the measurement modules M1–M3 is not connectionless; serial data to which a CRC or checksum has been added are transmitted to confirm whether the transmission content has been properly transmitted to the measurement module M1. If transmission fails, the serial data are resent.

Herein, a case in which two or more transmission destinations and transmission contents are set in the memory 33*h* will be described. The mode specifying means 33*j*, in response to the timing signal, reads the transmission destinations stored in the memory 33*h* as well as the transmission contents for these transmission destinations, and outputs them all in sequence to the sending/receiving means 33*c*. More specifically, in response to a single timing signal, it transmits transmission contents to multiple transmission destinations set simultaneously by the CPU 32.

In independent transmission mode (S22), the mode specifying means 33*j* reads the transmission destinations and transmission contents from the memory 33*i*, outputs the read transmission destinations and transmission contents to the sending/receiving means 33*c*, and causes it to perform transmission to the measurement modules M1–M3 set by the CPU 32. In response to this, the sending/receiving means 33*c* converts the transmission contents output from the mode specifying means 33*j* to serial data and sends them to the prescribed measurement modules M1–M3 through the serial bus SB. It should be noted that if no transmission destination and transmission content are set in the memory 33*i*, the mode specifying means 33*j* quickly ends this mode and changes to the next mode without outputting anything to the sending/receiving means 33*c*.

The operations of the measurement modules will now be described.

The communication processing unit 11 of the measurement modules M1–M3 receives the serial data sent by the main module 30, extracts the prescribed data from this received serial data (e.g., extracting a measurement-start command or sequence settings), and outputs them to the measurement unit 12. Next, the measurement unit 12, following these extracted data, performs measurements or sequence settings, for example. In addition, if a response to the main module 30 is required, it outputs the measurement data from the measurements to the communication processing unit 11 as response data in response to, for example, a measurement-start command. Furthermore, the communication processing unit 11 outputs the response data to the main module 30 during the time at which polling PM1–PM3 is being performed from the main module 30.

Figure 16:
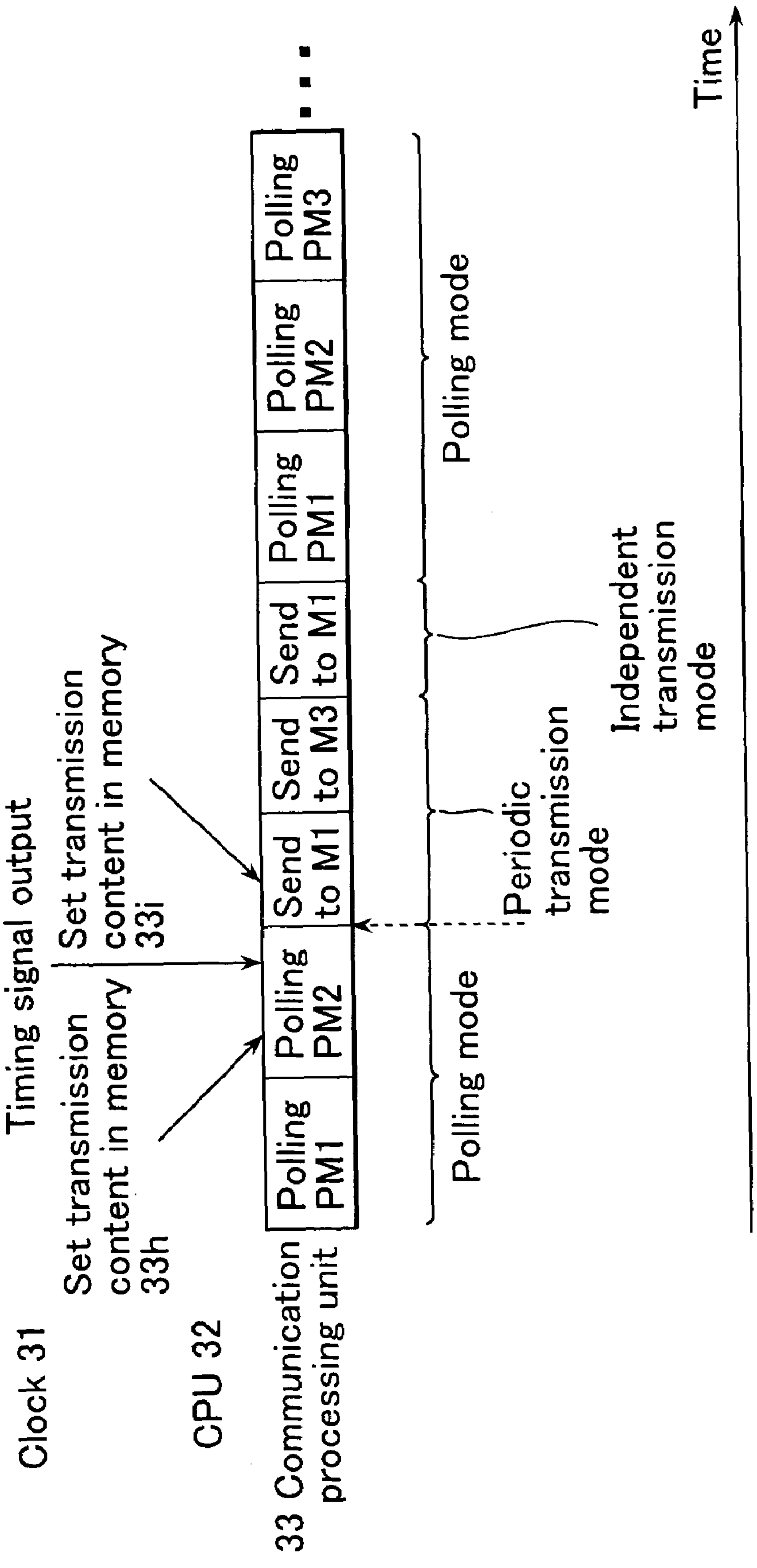
FIG. 16 is a diagram illustrating the first operational example of the apparatus shown in FIG. 14.
Figure 17:
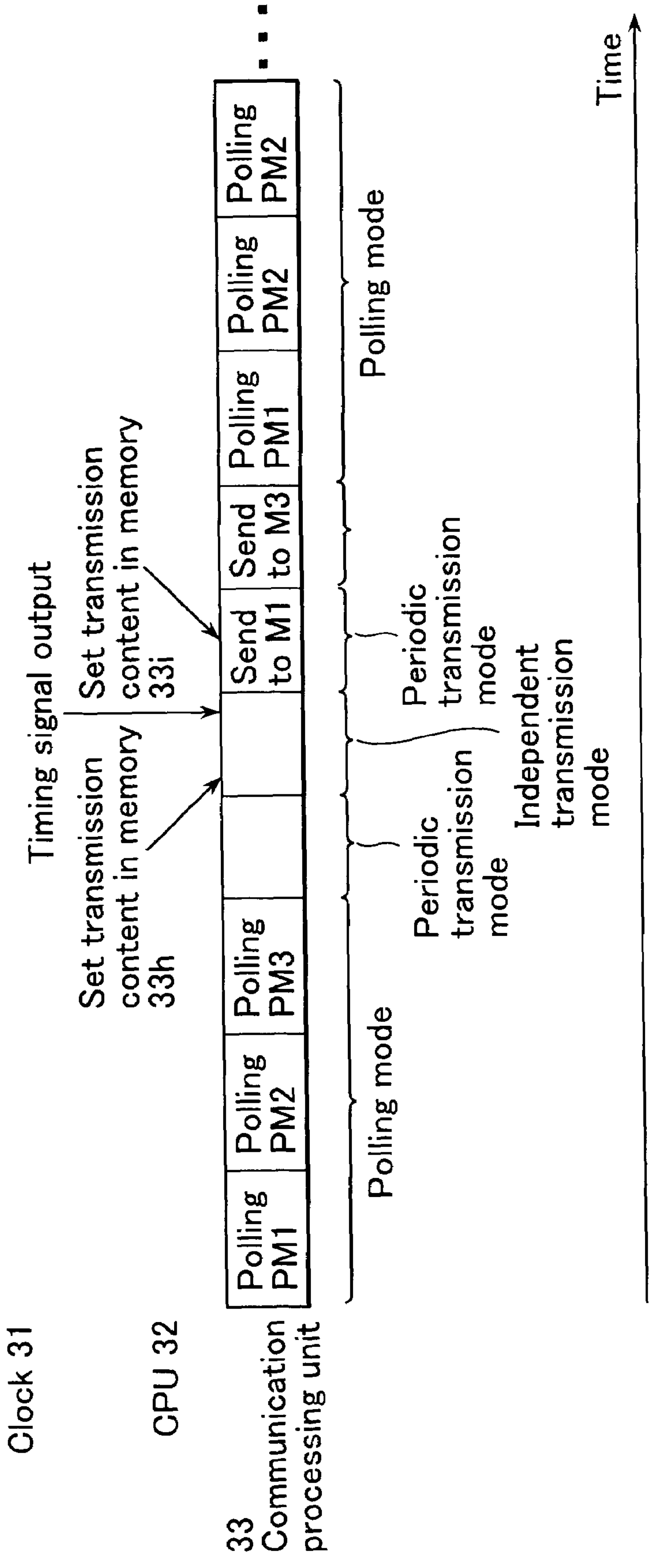
FIG. 17 is a diagram illustrating the second operational example of the apparatus shown in FIG. 14.

Next, an example of the operations of the main module 30 will be explained with respect to FIGS. 16 and 17. FIGS. 16 and 17 show examples of the operations of the clock 31, CPU 32, and communication processing unit 33. In FIGS. 16 and 17, the top row shows the operations of the clock 31, the middle row shows the operations of the CPU 32, and the bottom row shows the operations of the communication processing unit 33. The horizontal axis shows the time.

First, in FIG. 16, the mode specifying means 33*j* causes the sending/receiving means 33*c* to perform polling PM1–PM3 as polling mode. Herein, during polling PM2, the first transmission content is stored in the memory 33*h* from the CPU 32 with the measurement modules M1 and M3 set as the transmission destinations. Furthermore, a timing signal is input from the clock 31 to the mode specifying means 33*j*.

In response to this timing signal, the mode specifying means 33*j* causes the sending/receiving means 33*c* to cancel polling PM3. Next, the mode specifying means 33*j* changes to periodic transmission mode and outputs the transmission destination and transmission content in the memory 33*h* to the sending/receiving means 33*c*. The sending/receiving means 33*c* then sends the transmission content to the prescribed measurement modules M1 and M3.

Furthermore, in periodic transmission mode, the second transmission content is stored in the memory 33*i* from the CPU 32 with the measurement module M1 set as the transmission destination. Next, after periodic transmission mode ends, the mode specifying means 33*j* changes to independent transmission mode and outputs the transmission destination and transmission content in the memory 33*i* to the sending/receiving means 33*c*. The sending/receiving means 33*c* then sends the transmission content to the prescribed measurement module M1. Next, after independent transmission mode ends, the mode specifying means 33*j* changes to polling mode.

Next, in FIG. 17, the mode specifying means 33*j* causes the sending/receiving means 33*c* to perform polling PM1–PM3 as polling mode. Next, after polling mode ends, the mode specifying means 33*j* changes to periodic transmission mode. However, because a timing signal has not been input from the clock 31, it quickly changes to independent transmission mode.

However, because no transmission destination and transmission content have been stored in the memory 33*i*, the mode specifying means 33*j* does not output anything to the sending/receiving means 33*c*. Herein, during independent transmission mode, the first transmission content is stored in the memory 33*h* from the CPU 32 with the measurement modules M1 and M3 set as the transmission destinations. Furthermore, a timing signal is input from the clock 31 to the mode specifying means 33*j*.

In response to this timing signal, the mode specifying means 33*j* quickly changes from independent transmission mode to periodic transmission mode. Next, it outputs the transmission destination and transmission content in the memory 33*h* to the sending/receiving means 33*c*. The sending/receiving means 33*c* then sends the transmission content to the prescribed measurement modules M1 and M3.

Furthermore, during periodic transmission mode, the second transmission content is stored in the memory 33*i* from the CPU 32 with the measurement module M1 set as the transmission destination, but after periodic transmission mode ends, the sending/receiving means 33*c* changes to polling mode.

Thus, if the timing signal input from the clock 31 occurs during polling mode, the mode specifying means 33*j* cancels rest of polling and changes to periodic transmission mode. During independent transmission mode, it changes to periodic transmission mode without changing to polling mode, and during periodic transmission mode, it causes the sending/receiving means 33*c* to send the first transmission content in the memory 33*h* to the prescribed measurement modules M1–M3. Thus, it is possible to prioritize the transmission of transmission content (first transmission content) for which transmission at a prescribed transmission interval is important, even though the serial bus SB is a single system. Because of this, it is possible to reduce transmission interval errors without increasing the number of serial buses. Therefore, it is possible to shorten the transmission interval; it is possible to repeatedly transmit the first transmission content at high speed; and the main module 30 can engage in communication with multiple measurement modules M1–M3 at high speed.

In addition, if the timing signal is input from the clock 31 in polling mode, the mode specifying means 33*j* cancels polling PM1–PM3, changes to periodic transmission mode, and causes the sending/receiving means 33*c* to transmit the first transmission content in the memory 33*h* to the prescribed measurement modules M1–M3. Therefore, it is possible to reduce fluctuation in transmission interval errors.

More specifically, with prior art apparatuses, there are differences in the transmission interval error depending on whether a timing signal is input during polling PM1 or polling PM2. However, with the apparatus shown in FIG. 14, when a timing signal is input in, for example, polling PM1 or polling PM2, the next polling (PM2 or PM3) is cancelled and the mode changes to periodic transmission mode. For this reason, the time required between the input of the timing signal and the transmission of the transmission content is nearly constant. Therefore, it is possible to reduce fluctuation in transmission interval errors.

Figure 5:
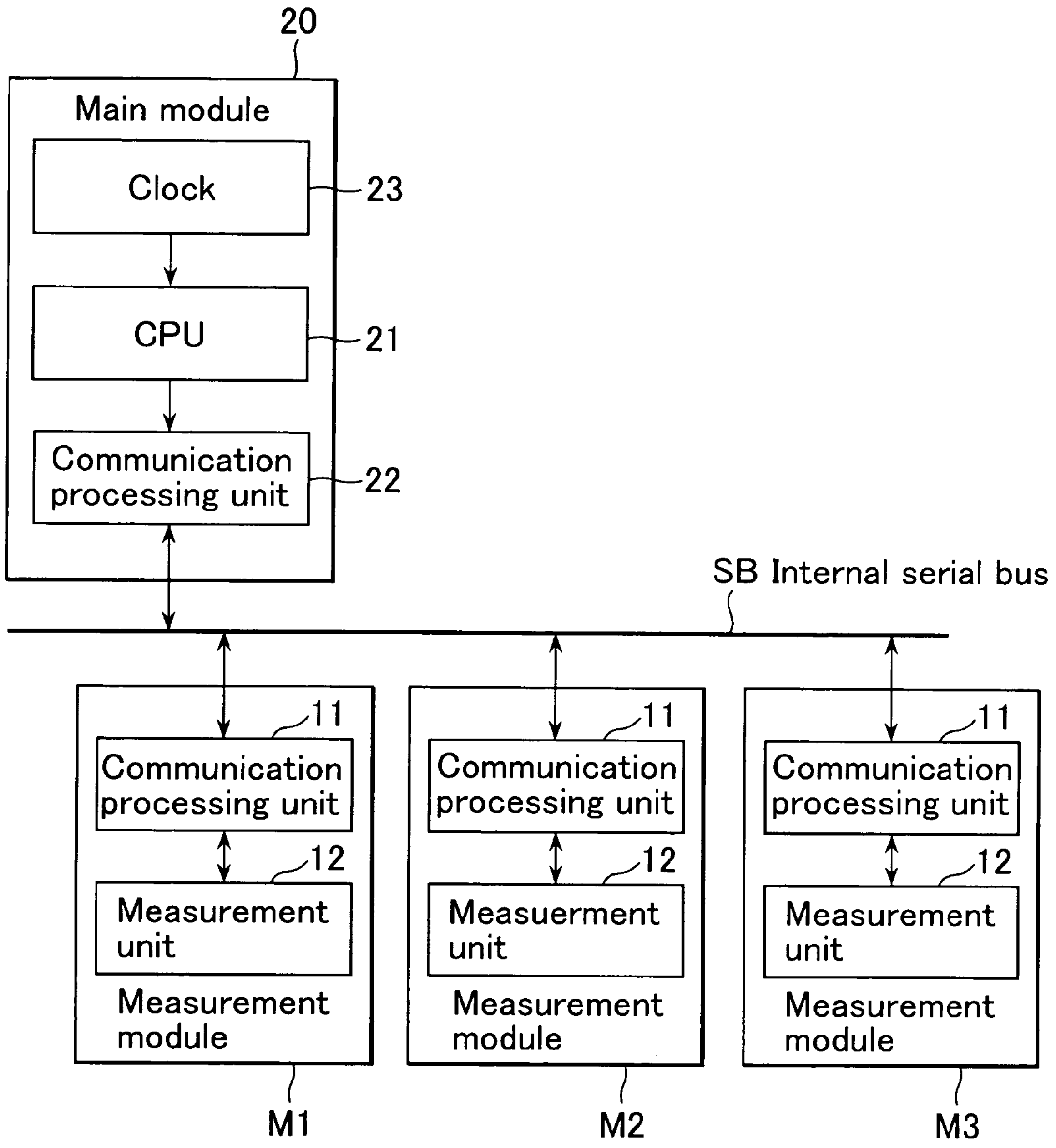
FIG.5 (Prior Art)
FIG. 5 is a diagram illustrating the detailed structure of the apparatus shown in FIG. 1.
Figure 6:
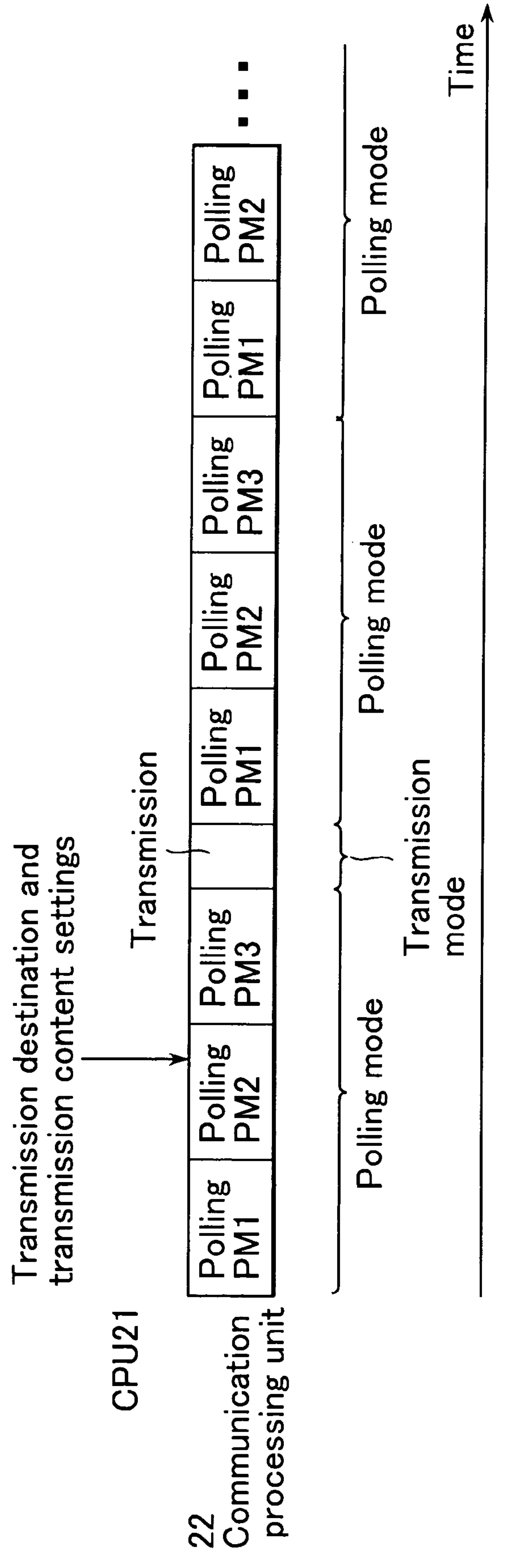
FIG.6 (Prior Art)
FIG. 6 is a diagram illustrating an example of the operations in the apparatus shown in FIG. 5.
Figure 7:
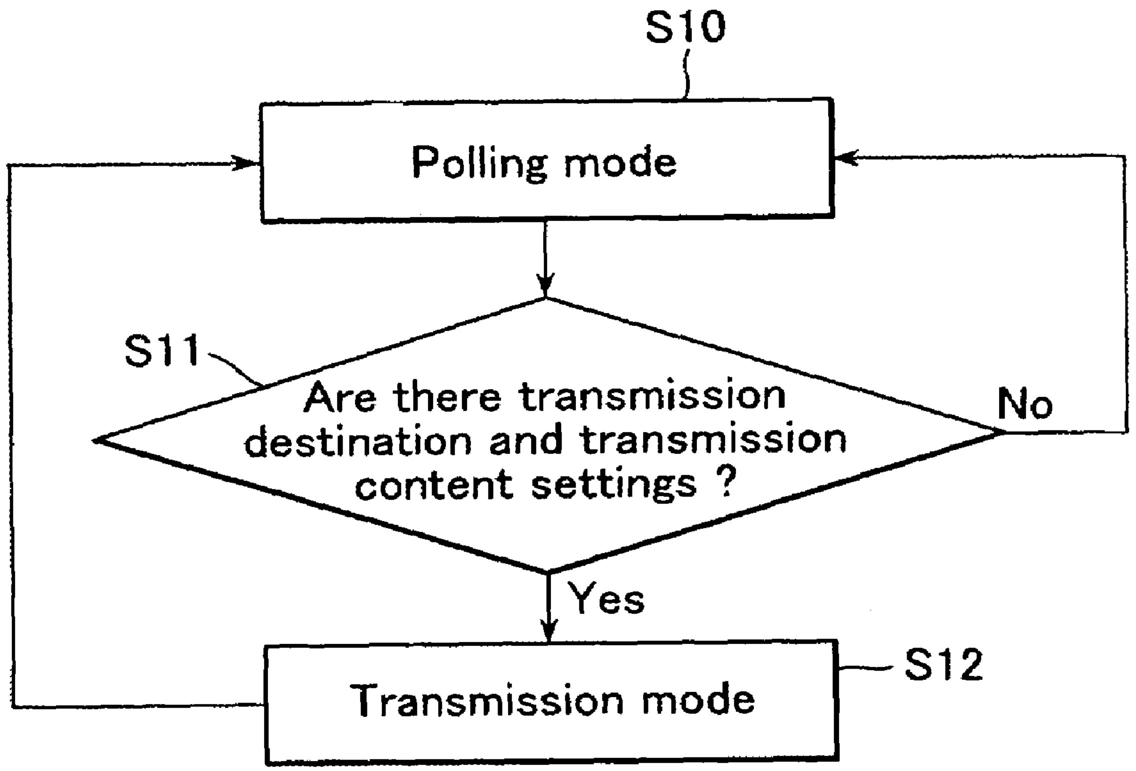
(Prior Art) FIG.7
FIG. 7 is a flowchart illustrating the state transitions of the communication processing unit 22 shown in FIG. 5.
Figure 8:
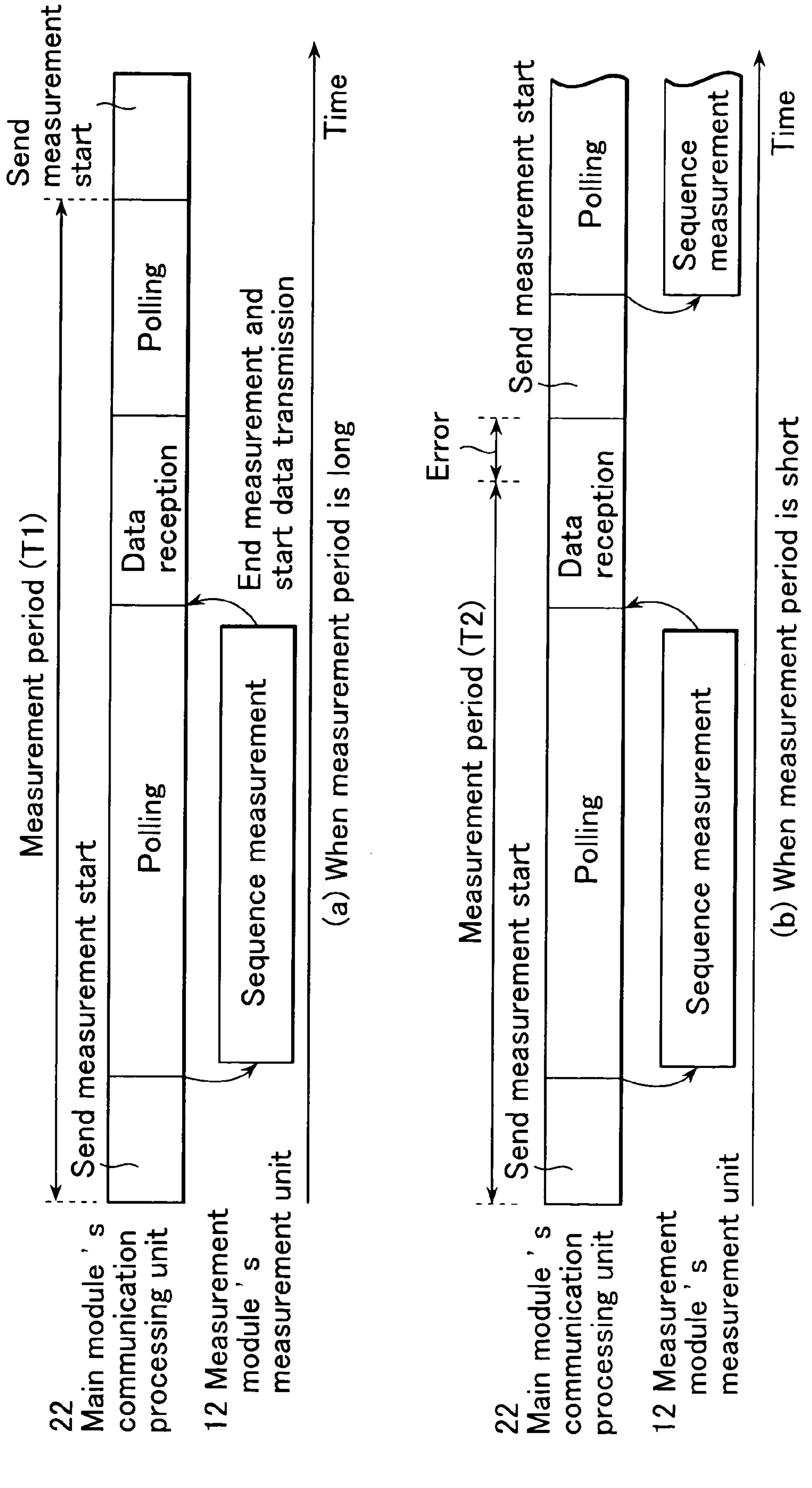
FIG.8 (Prior Art)
FIG. 8 is a diagram illustrating the operations of a prior art multi-point data acquisition apparatus.

In addition, because the mode specifying means 33*j* sends the transmission content to the transmission destination set in the memory 33*h* based on the timing signal from the clock 31, it is possible to reduce the transmission interval error regardless of the load state of the CPU 32. Therefore, it is possible to reduce the transmission interval, and it is possible to repeatedly transmit the first transmission content at high speed. More specifically, with the apparatus shown in FIG. 5, when the CPU 21 is performing other processes and enters a high-load state, the setting in the communication processing unit 22, which is based on the timing signal from the clock 23, is delayed. However, because the mode specifying means 33*j* sends the transmission content to the transmission destination set in the memory 33*h* based on the timing signal from the clock 31, it is possible to reduce the transmission interval error regardless of the load state of the CPU 32. Therefore, it is possible to repeatedly transmit the first transmission content at high speed, and it is possible to engage in communication with multiple measurement modules at high speed.

Furthermore, because the CPU 32 simultaneously sets multiple transmission destinations and transmission contents in the memory 33*h*, and the mode specifying means 33*j* causes the sending/receiving means 33*c* to sequentially transmit the transmission contents to the multiple transmission destinations set in the memory 33*h* based on a single timing signal from the clock 31, it is possible to reduce the transmission time difference between the measurement modules M1–M3. Because of this, it is possible to engage in communication with multiple measurement modules M1–M3 at high speed.

More specifically, with the prior art, the CPU 21 can only set transmission content for a single measurement module in a single setting, so depending on the load state of the CPU 21, there may be a large transmission time difference between the measurement modules M1–M3. However, because the CPU 32 simultaneously sets multiple transmission destinations and transmission contents in the memory 33*h*, and the mode specifying means 33*j* causes the sending/receiving means 33*c* to sequentially transmit the transmission contents to the multiple transmission destinations set in the memory 33*h* based on a single timing signal from the clock 31, it is possible to reduce the transmission time difference between the measurement modules M1–M3. Because of this, it is possible to engage in communication with multiple measurement modules at high speed, and it is possible to reduce the transmission interval error. Therefore, it is possible to repeatedly transmit the first transmission content at high speed, and it is possible to engage in communication with multiple measurement modules M1–M3 at high speed.

It should be noted that the present invention is not limited to the above, but may also be as described below.

(iii-1) In the apparatus shown in FIG. 14, the mode specifying means 33*j* was structured to sequentially repeat polling mode, periodic transmission mode, and independent transmission mode. However, it is also permissible to set all transmission contents as first transmission contents, and to sequentially repeat polling mode and periodic transmission mode. It is also permissible to repeat just polling mode, changing to periodic transmission mode when a timing signal is input. Of course, in this case, it is not necessary to provide the memory 33*i*.

(iii-2) In the apparatus shown in FIG. 14, the mode specifying means 33*j* was structured to sequentially repeat polling mode, periodic transmission mode, and independent transmission mode. However, it is also permissible to sequentially repeat polling mode and independent transmission mode, changing to periodic transmission mode when a timing signal is input.

(iii-3) In FIG. 16, which illustrates an example of the operations of the apparatus shown in FIG. 14, a structure is illustrated wherein the mode specifying means 33*j* cancels polling mode after polling PM2 ends. However, it is also permissible for the mode specifying means 33*j* to cancel polling mode during polling PM2 when a timing signal is input.

(iii-4) In FIG. 15, which illustrates the operations of the mode specifying means 33*j* in the apparatus shown in FIG. 14, a structure is illustrated wherein, when a timing signal is input, the mode changes to periodic transmission mode (S23, S24), and then changes to polling mode (S20). However, it is also permissible, when a timing signal is input, to change to periodic transmission mode (S23, S21), and then change to independent transmission mode (S22).

(iii-5) In the apparatus shown in FIG. 14, a structure is illustrated wherein the mode specifying means 33*j* reads the transmission destinations and transmission contents from the memory 33*h*. However, it is also permissible to clear the transmission destinations stored in the memory 33*h* after all set transmission destinations have been read. This makes it possible to reduce the load on the CPU 32 without requiring the CPU 32 to clear the transmission destinations.

(iii-6) In the apparatus shown in FIG. 14, a structure is illustrated wherein transmission is made to a single measurement module M1 in independent transmission mode. However, it is also permissible to transmit to multiple measurement modules M1–M3 in independent transmission mode.

(iii-7) In the apparatus shown in FIG. 14, a structure is illustrated wherein, when a timing signal is input prior to changing to periodic transmission mode, periodic transmission mode is changed to, after which the transmission destinations and transmission contents of the memory 33*h* are output to the sending/receiving means 33*c*. However, it is also permissible, when a timing signal is input in periodic transmission mode, to immediately output the transmission destinations and transmission contents of the memory 33*h* to the sending/receiving means 33*c*.

(iii-8) In the apparatus shown in FIG. 14, a structure is illustrated wherein there are three measurement modules M1–M3. However, any prescribed number of measurement modules may be provided.

(iv) Case in Which the Measurement Modules M1–M3 Transmit Measurement Data to the Main Module

Fifth Embodiment

Figure 18:
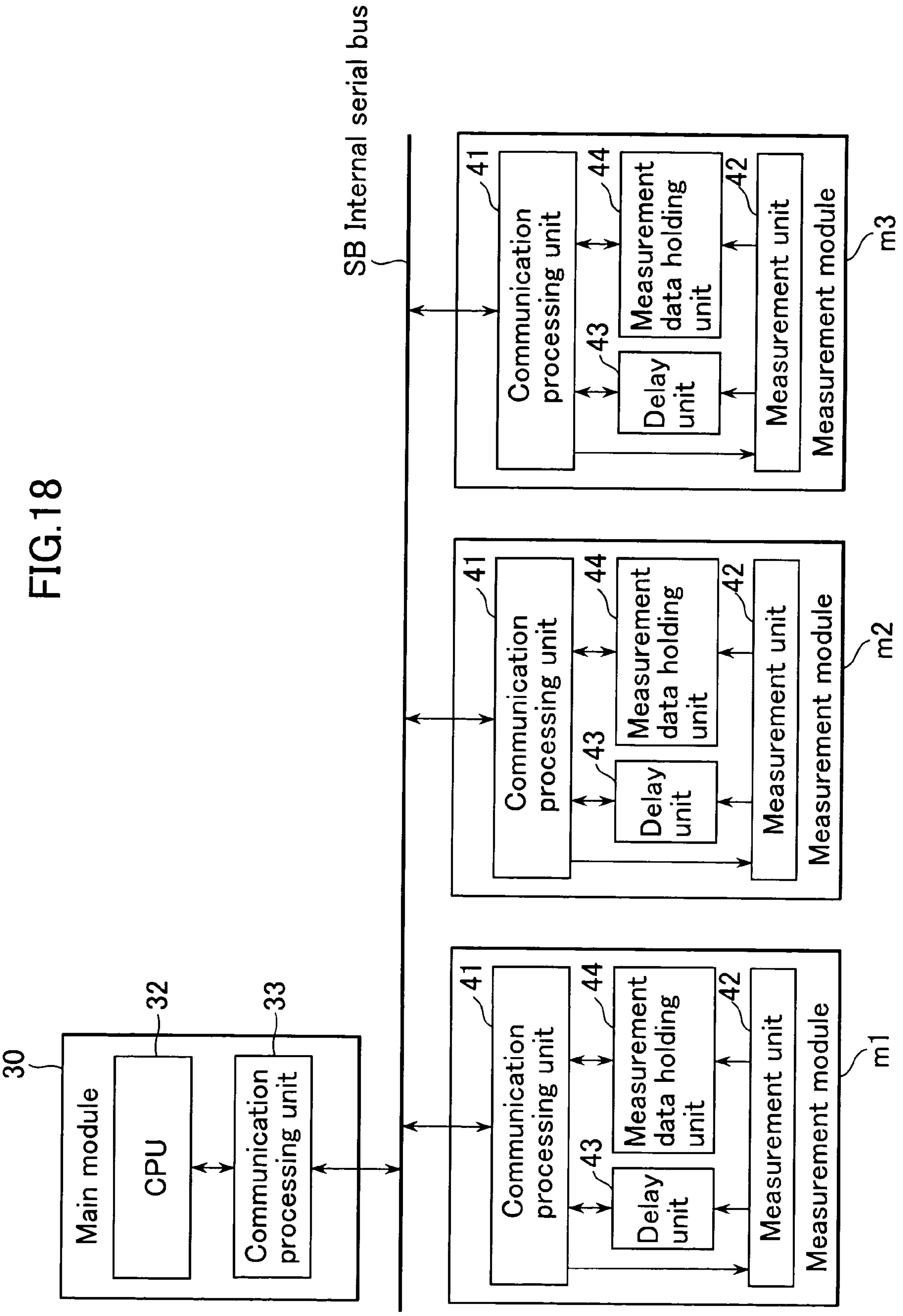
FIG. 18 is a block diagram illustrating the fifth embodiment of the present invention.

FIG. 18 is a block diagram illustrating the fifth embodiment of the present invention. Herein, items which are the same as in FIGS. 9, 11, and 14 are denoted by the same symbols and not described. In addition, the structure pertaining to the invention is illustrated and will be described.

In FIG. 18, the CPU 32 is a specifying unit. In addition, measurement modules m1–m3 are provided instead of measurement modules M1–M3. The measurement modules m1–m3 comprise a communication processing unit 41, measurement unit 42, delay unit 43, and measurement data holding unit 44. They perform measurements after receiving a measurement-start command from the main module 30 through the serial bus SB; hold the measurement data from these measurements; and send them to the main module 30 after receiving the next measurement-start command.

The communication processing unit 41 receives a measurement-start command from the main module 30 through the serial bus SB, and in response to the measurement-start command, reads measurement data from the measurement data holding unit 44 and sends the read measurement data to the communication processing unit 33 of the main module 30.

The measurement unit 42 measures the measurement subject in response to a measurement-start command from the communication processing unit 41, outputs a measurement-end signal to the communication processing unit 41, and outputs the measurement data from the measurement to the measurement data holding unit 44. It should be noted that the "measurement-end signal" is something which indicates the number of pieces of data in the measurement data from sequence measurement by the measurement unit 42 in the same manner as for the measurement unit 12 of the measurement modules M1–M3, and indicates that the measurement data are valid.

The delay unit 43 outputs the measurement-end signal from the measurement unit 42 to the communication processing unit 41 after delaying it for a prescribed length of time. The measurement data holding unit 44 holds the measurement data from the measurement unit 42.

The operations of such an apparatus will now be described.

Figure 19:
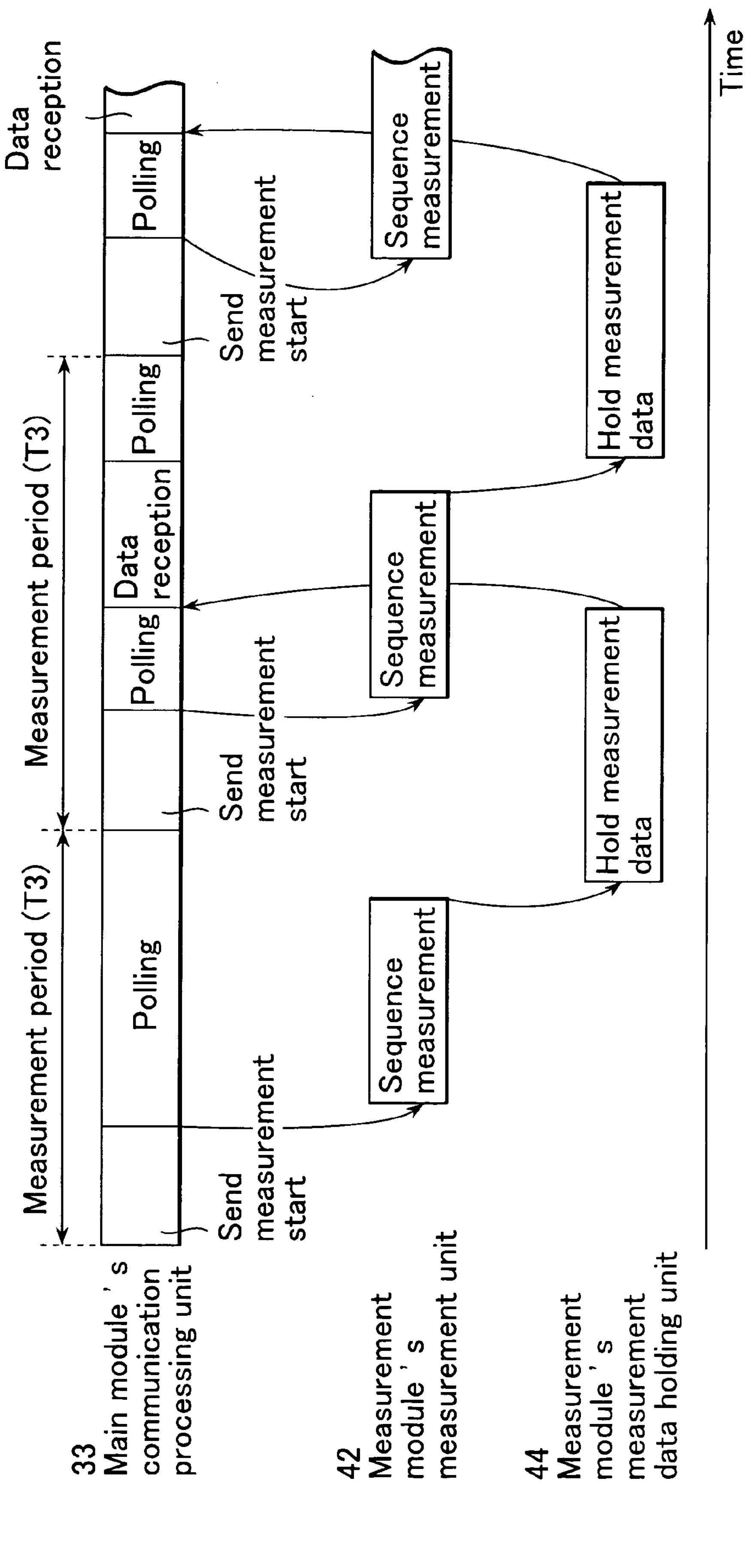
FIG. 19 is a diagram illustrating an example of the operations of the apparatus shown in FIG. 18.

FIG. 19 is a diagram illustrating an example of the operations of the present apparatus. In FIG. 19, the top row shows the operations of the communication processing unit 33 of the main module 30; the middle row shows the operations of the measurement unit 42 of the measurement modules m1–m3; and the bottom row shows the operations of the measurement data holding unit 44 of the measurement modules m1–m3. The horizontal axis shows the time.

The CPU 32 of the main module 30 outputs the first measurement-start command to the communication processing unit 33, setting the measurement module m1, for example, among the measurement modules m1–m3, as the transmission destination.

Herein, the CPU 32 outputs a measurement-start command to the communication processing unit 33 every measurement period T3 (T3<T1), using as a reference an interrupt signal from a clock (not shown). Of course, the measurement period T3 is set to be longer than the time required for the measurement unit 42 to perform sequence measurement.

The communication processing unit 33 converts the commands from the CPU 32 to serial data and sends the serial data to the measurement module m1 (the transmission destination) through the internal serial bus SB, performing serial communication. It should be noted that serial communication is not connectionless; serial data to which a CRC or checksum has been added are transmitted to confirm whether the transmission content has been properly transmitted to the measurement module m1. If transmission fails, the serial data are resent.

Next, when serial communication with the measurement module m1 ends, the communication processing unit 33 notifies the CPU 32 of the end of communication.

In response to this, the CPU 32 causes the communication processing unit 33 to perform the first polling for receiving measurement data, until the second measurement-start command is output. In addition, after the measurement period T3 passes, the CPU 32 outputs the second measurement-start command.

The communication processing unit 41 of the measurement module m1 extracts the first measurement-start command from the received serial data and outputs it to the measurement unit 42. In response to this, the measurement unit 42 performs sequence measurement on the measurement subject, following the first measurement-start command.

Next, when the first sequence measurement ends, the measurement unit 42 outputs a measurement-end signal to the delay unit 43 and outputs the measurement data to the measurement data holding unit 44. This causes the measurement data holding unit 44 to hold the measurement data.

In addition, the delay unit 43 outputs the measurement-end signal to the communication processing unit 41 after delaying it for a prescribed length of time. The "prescribed length of time" extends up until the communication processing unit 33 of the main module 30 sends the second measurement-start command and performs the second polling. In other words, it extends up until the communication processing unit 41 of the measurement module m1 receives the second measurement-start command. This delay time is determined once the serial data transfer rate, the measurement conditions for sequence measurement by the measurement unit 42, and the like are set. Therefore, the delay time to be implemented by the delay unit 43 should be set before measurement is started.

Next, together with the input of the measurement-end signal from the delay unit 43, the communication processing unit 41 reads the first measurement data from the measurement data holding unit 44, converts them to serial data, and sends them to the communication processing unit 33 of the main module 30.

More specifically, the communication processing unit 41 of the measurement module m1 transmits the first measurement data while the communication processing unit 33 of the main module 30 is performing polling after sending the second measurement-start command. Of course, the measurement unit 42 starts the second sequence measurement in response to the second measurement-start command from the communication processing unit 41.

Next, the communication processing unit 33 of the main module 30 extracts the measurement data from the received serial data and stores them in a memory (not shown), and notifies the CPU 32 that the first measurement data have been received.

In response to this notification, the CPU 32 instructs a signal processing unit (not shown) to process the first measurement data, and causes the communication processing unit 33 to continue the second polling until the measurement period T3 passes, i.e., until the third measurement-start command is output to the communication processing unit 33. Next, when the third measurement start time is reached, the CPU 32 outputs a measurement-start command to the communication processing unit 33, and thereafter in the same manner causes it to perform measurements a prescribed number of times, and collects measurement data.

The operations of causing the measurement modules m2 and m3 to perform measurements and collecting data are not described because they are similar, except for the fact that the CPU 32 of the main module 30 sets the measurement modules m2 and m3 as transmission destinations, and the communication processing unit 33 engages in communication with the set measurement modules m2 and m3.

Thus, the delay unit 43 outputs the measurement-end signal from the measurement unit 42 to the communication processing unit 41 after delaying it until the communication processing unit 41 receives the next measurement-start command. In addition, because the communication processing unit 41 reads the measurement data from the measurement data holding unit 44 and sends the measurement data to the communication processing unit 33 of the main module 30 in response to this measurement-end signal, it is possible to offset the sending/receiving times for the measurement-start command and measurement data, even if the measurement period T3 is short, e.g., (measurement−start command sending time+sequence measurement time+measurement data receiving time)>(measurement period T3). Because of this, it is possible to minimize the error in measurement period T3. Therefore, the main module 30 can engage in communication with multiple measurement modules at high speed, and the measurement modules m1–m3 can perform repeated measurements at high speed in accordance with the measurement-start commands.

It should be noted that the present invention is not limited to the above, but may also be as described below.

(iv-1) The measurement unit 42 was structured so as to output measurement data to the measurement data holding unit 44 when measurement ends. However, the measurement unit 42 may also be structured so as to sequentially output acquired measurement data to the measurement data holding unit 44 while performing measurements. In this case, the measurement data holding unit 44 should be structured so as to hold measurement data equivalent to at least two sequences.

(iv-2) The delay unit 43 was structured so as to output a measurement-end signal to the communication processing unit 41, and the communication processing unit 41 was structured so as to read measurement data from the measurement data holding unit 44 when the measurement-end signal is received as input. However, it is also permissible to structure the delay unit 43 to output the measurement-end signal to the measurement module m1 and measurement data holding unit 44, and structure the measurement data holding unit 44 to output its held measurement data to the communication processing unit 41 when the measurement-end signal is received as input.

(iv-3) The delay unit 43 was structured so as to output a measurement-end signal to the communication processing unit 41, and the communication processing unit 41 was structured so as to read measurement data from the measurement data holding unit 44 when the measurement-end signal is received as input. However, it is also permissible to structure the delay unit 43 to output the measurement-end signal only to the measurement data holding unit 44, and structure the measurement data holding unit 44 to output its held measurement data to the communication processing unit 41 when the measurement-end signal is received as input.

(iv-4) A structure was presented in which there are three measurement modules m1–m3. However, it is permissible to provide any desired number of measurement modules.

(iv-5) The measurement modules m1–m3 were structured so as to communicate with the main module 30, but it is also permissible for them to communicate with the main module 20 shown in FIG. 1.

The present invention provides benefits such as the following.

The communication processing unit sequentially sends transmission contents to multiple measurement modules which are set as transmission destinations, in response to a timing signal from the timing generating unit. Therefore, regardless of the load state of the setting unit, it is possible to start transmission simultaneous with the timing signal, and it is possible to reduce the transmission time difference between the measurement modules. Because of this, it is possible to engage in communication with multiple measurement modules at high speed. Therefore, even if more measurement modules are connected, in practical terms they can be regarded as performing synchronized measurements.

When communication with the measurement modules set as transmission destinations ends, the communication processing unit erases the transmission destination settings held in the storage means. For this reason, it is not necessary for the setting unit to erase the transmission destinations in the storage unit after receiving a communication-end notification. This makes it possible to reduce the load of the setting unit. Therefore, it is possible for the setting unit to perform other processes with stability.

In addition, the signal generating means outputs first and second timing signals of prescribed time intervals based on a clock signal from the real-time clock. For this reason, it is possible to transmit the transmission contents to the measurement modules without relaying on the time interval of the clock signal from the real-time clock.

In addition, the communication processing unit collects data by polling the polling destinations set by the setting unit, and holds the communication history based on the communication content at the time of this collection. In addition, the communication processing unit polls measurement modules which do not have a communication history, so it is possible to perform polling efficiently, and the main module can engage in communication with multiple measurement modules at high speed. Therefore, it is possible to receive data from multiple measurement modules at high speed.

In addition, because the received-data storage unit stores received data in different locations for each measurement module, it is not necessary to stop data collection by polling and process the received data each time data are received. Thus it is possible to receive data at high speed from multiple measurement modules. In addition, because the setting unit can process received data in parallel with data reception without being affected by the communication state, it is possible to reduce the load on the setting unit.

In addition, when a timing signal is received as input in a prescribed period, even if measurement modules to be polled still remain, the communication processing unit cancels the polling and sends the transmission content to the prescribed measurement module. For this reason, it is possible to reduce the transmission interval error without increasing the number of serial buses. Therefore, it is possible to reduce the transmission interval, and to perform repeated transmissions at high speed. In addition, the main module can engage in communication with multiple measurement modules at high speed.

In addition, if the input timing signal occurs during polling mode, the communication processing unit cancels the polling and changes to the first transmission mode; and if it occurs during the second transmission mode, it changes to the first transmission mode without changing to polling mode. In addition, in the first transmission mode, it reads the first transmission content of the first storage unit and causes the sending/receiving means to send it to the prescribed measurement module. Therefore, even though the serial bus is a single system, it is possible to prioritize transmission content (the first transmission content) for which transmission in the prescribed transmission interval is important. This makes it possible to reduce the transmission interval error without increasing the number of serial buses. Therefore, it is possible to reduce the transmission interval, and to perform repeated transmissions of the first transmission content at high speed. In addition, it is possible to engage in communication with multiple measurement modules at high speed.

In addition, the setting unit simultaneously sets multiple transmission destinations and the first transmission content in the first storage unit, and the mode specifying means causes the sending/receiving means to sequentially send the transmission content to the multiple transmission destinations set in the first storage means in response to a single timing signal from the timing generating unit. For this reason, it is possible to reduce the transmission time difference between the measurement modules. Because of this, it is possible to engage in communication with multiple measurement modules at high speed, and to reduce the transmission interval error. Therefore, it is possible to repeatedly transmit the first transmission content at high speed, and to engage in communication with multiple measurement modules at high speed.

Furthermore, because the measurement modules transmit the measurement data from measurements to the main module after receiving the next measurement-start command, even if the measurement period is short, it is possible to offset the sending/receiving times of the measurement-start command and measurement data. Because of this, it is possible to minimize the error in measurement period.

Therefore, the main module can engage in communication with multiple measurement modules at high speed, and the measurement modules can perform repeated measurements at high speed.

What is claimed is:

1. A multi-point data acquisition apparatus comprising a main module which performs serial communication through a serial bus to multiple measurement modules connected to a single-system serial bus, wherein said main module comprises:

a timing generating unit which outputs a first timing signal and second timing signal;

a setting unit which sets multiple transmission destinations which are measurement modules to be engaged in serial communication, and multiple transmission contents, based on said first timing signal from said timing generating unit; and a communication processing unit which holds said multiple transmission destinations and multiple transmission contents set by said setting unit, and, based on said second timing signal from said timing generating unit, sequentially sends transmission contents through said serial bus to said multiple measurement modules set as transmission destinations, performing serial communication.

2. The multi-point data acquisition apparatus of claim 1, wherein said communication processing unit comprises:

a storage means which stores multiple transmission destinations and respective transmission contents which are set by said setting unit; and a sending/receiving means which reads said transmission destinations and transmission contents of said storage means and sequentially sends said transmission contents through said serial bus to said multiple measurement modules set as transmission destinations, performing serial communication, based on said second timing signal from said timing generating unit.

3. The multi-point data acquisition apparatus of claim 2, wherein when serial communication with a measurement module which is a transmission destination set in said storage means ends, said communication processing unit erases said transmission destination which has completed serial communication from said storage means.

4. The multi-point data acquisition apparatus of claim 2 or 3, wherein said setting unit sets transmission destinations and transmission contents in said storage means to be offset from the times at which said sending/receiving means of said communication processing unit reads said transmission destinations and transmission contents from said storage means.

5. The multi-point data acquisition apparatus of claim 2 or 3, wherein said timing generating unit comprises:

a real-time clock which outputs a clock signal at prescribed time intervals; and a signal generating means which outputs a first timing signal and second timing signal based on said clock signal from said real-time clock;

and said first and second timing signals are output at time intervals which differ from the time interval of said clock signal.

6. The multi-point data acquisition apparatus of claim 5, wherein said signal generating means has different time intervals for outputting said first timing signal and said second timing signal.

7. A multi-point data acquisition apparatus comprising a main module which performs serial communication through a serial bus to multiple measurement modules connected to a single-system serial bus, wherein said main module comprises:

a setting unit which sets a prescribed module, among said multiple measurement modules, as a polling destination;

a communication processing unit which collects data by polling from said measurement module set as said polling destination by said setting unit; holds a communication history based on a communication content at the time of data collection; and provides notification of said communication content to said setting unit; and a received-data storage unit which stores data received by said communication processing unit;

and said communication processing unit performs data collection by polling from said measurement modules which do not hold said communication history.

8. The multi-point data acquisition apparatus of claim 7, wherein said communication processing unit comprises:

a polling destination storage means which stores polling destinations;

a communication history storage unit which stores communication histories;

a selection means which reads polling destinations from said polling destination storage means, reads said communication histories from said communication history storage unit, and selects a measurement module lacking said communication histories from said polling destinations; and a sending/receiving means which collects data by polling with a measurement module selected by said selection means set as a polling destination, and stores, in said communication history storage unit, a communication history based on a communication content at the time of data collection.

9. The multi-point data acquisition apparatus of claim 8, wherein said sending/receiving means treats, as communication histories, cases where communication ends by normal means for the content of communication with a measurement module which is said polling destination and data have been added to a response from said measurement module which is said polling destination, and cases where communication does not end in a normal procedure for said communication content.

10. The multi-point data acquisition apparatus of claim 9, wherein said communication history storage unit comprises:

an error history storage means which stores measurement modules for which communication does not end normally; and a reception history storage means which stores measurement modules for which communication ends normally and data are received.

11. The multi-point data acquisition apparatus of claim 10, wherein said selection means reads communication histories from at least said error history storage means or said reception history storage means.

12. The multi-point data acquisition apparatus of claim 10 or 11, wherein said received-data storage unit stores data received from said measurement modules separately for each of said measurement modules and said communication processing unit notifies said setting unit when there is a change to said error history storage means or said reception history storage means.

13. The multi-point data acquisition apparatus of claim 12, wherein said received-data storage unit is a ring buffer.

14. The multi-point data acquisition apparatus of claim 12, wherein said received-data storage unit is provided for each of said measurement modules.

15. A multi-point data acquisition apparatus comprising a main module which performs serial communication through a serial bus to multiple measurement modules connected to a single-system serial bus, wherein said main module comprises:

a timing generating unit which outputs timing signals in prescribed periods;

a setting unit which sets transmission contents for a prescribed measurement module among said multiple measurement modules; and a communication processing unit which receives data by sequentially polling said multiple measurement modules, and sends said transmission contents to said prescribed measurement module set by said setting unit based on a timing signal output from said timing generating unit;

and, when said timing signal is input, said communication processing unit cancels the polling of the next measurement module and sends said transmission contents.

16. The multi-point data acquisition apparatus of claim 15, wherein said setting unit sets said first transmission content and second transmission content with said prescribed measurement module set as a transmission destination, and said communication processing unit sequentially changes to a polling mode for polling, a first transmission mode for sending said first transmission content set by said setting unit with said prescribed measurement module set as said transmission destination, and a second transmission mode for sending said second transmission content set by said setting unit with said prescribed measurement module set as said transmission destination; when said timing signal is input during said second transmission mode, a change to said first transmission mode is made after said second transmission mode ends.

17. The multi-point data acquisition apparatus of claim 15, wherein said communication processing unit comprises:

a first storage means which stores said first transmission content and said transmission destination set by said setting unit;

a second storage means which stores said second transmission content and said transmission destination set by said setting unit;

a mode specifying means which reads said transmission destinations, said first transmission content and said second transmission content from said first storage means and said second storage means respectively, sequentially changes to said polling mode, said first transmission mode, and said second transmission mode, and changes to said first transmission mode based on said timing signal; and a sending/receiving means which is connected to said serial bus, polls said measurement modules based on instructions from said mode specifying means, and transmits, to said measurement module which is said transmission destination, said first transmission content and said second transmission content, which are output from said mode specifying means.

18. The multi-point data acquisition apparatus of claim 17, wherein when said timing signal is input and said transmission content is stored in said first storage means, said mode specifying means outputs said first transmission content to said sending/receiving means; and when said second transmission content is stored in said second storage means, outputs said second transmission content to said sending/receiving means.

19. The multi-point data acquisition apparatus of claim 17 or 18, wherein said setting unit sets two or more measurement modules among said multiple measurement modules as transmission destinations, and sets said first transmission content for each of said transmission destinations; said first storage means stores said two or more transmission destinations set by said setting unit, as well as said first transmission content for each of said transmission destinations; and said mode specifying means sequentially outputs, to said sending/receiving means, said first transmission contents for all of said transmission destinations stored in said first storage means based on said timing signal.

20. The multi-point data acquisition apparatus of any of claims 16 through 18, wherein a transmission destination to which said setting unit sends said first transmission content is different from a transmission destination to which it sends said second transmission content.

21. A multi-point data acquisition apparatus comprising a main module which is connected to a single-system serial bus, transmits measurement-start commands through said serial bus in prescribed measurement periods, and receives measurement data, said multi-point data acquisition apparatus further comprising multiple measurement modules which perform measurements after receiving a measurement-start command from said main module through said serial bus; hold said measurement data from said measurements; and transmit said measurement data to said main module after receiving the next measurement-start command.

22. The multi-point data acquisition apparatus of claim 21, wherein said measurement modules comprise:

a communication processing unit which receives a measurement-start command from said main module through said serial bus, and sends measurement data to said main module in response to a measurement-end signal;

a measurement unit which performs measurements on a measurement subject in response to a measurement-start command from said communication processing unit, and outputs a measurement-end signal as well as said measurement data from said measurements;

a delay unit which outputs said measurement-end signal from said measurement unit to said communication processing unit after delaying said measurement-end signal for a prescribed length of time; and a measurement data holding unit which holds said measurement data from said measurement unit, and outputs said measurement data to said communication processing unit based on said measurement-end signal which is delayed by said delay unit.

23. The multi-point data acquisition apparatus of claim 22, wherein said communication processing unit reads the measurement data of said measurement data holding unit when said measurement-end signal is input from said delay unit.

24. The multi-point data acquisition apparatus of claim 22, wherein said measurement data holding unit outputs said measurement data being held to said communication processing unit when said measurement-end signal output by said delay unit is input.

25. The multi-point data acquisition apparatus of claim 21, wherein said measurement modules comprise:

a communication processing unit which receives a measurement-start command from said main module through said serial bus, and sends measurement data to said main module;

a measurement unit which performs measurements on a measurement subject in response to a measurement-start command from said communication processing unit, and outputs a measurement-end signal as well as said measurement data from said measurements;

a delay unit which delays said measurement-end signal from said measurement unit for a prescribed length of time; and a measurement data holding unit which holds said measurement data from said measurement unit, and outputs said measurement data being held to said communication processing unit when said measurement-end signal, which is output from and delayed by said delay unit, is input.

* * * * *